United States Patent [19]
Bueno et al.

[11] Patent Number: 5,636,299
[45] Date of Patent: Jun. 3, 1997

[54] HYBRID LUMINESCENT DEVICE AND METHOD FOR IMAGING PENETRATING RADIATION

[75] Inventors: Clifford Bueno, Sunnyvale; Robert A. Betz, Fremont; Richard W. Mead, Los Altos Hills; Harold J. Ellis, San Jose; Richard L. Rairden, Palo Alto, all of Calif.

[73] Assignee: Lockheed Missiles & Space Company, Inc., Sunnyvale, Calif.

[21] Appl. No.: 381,526

[22] Filed: Jan. 31, 1995

Related U.S. Application Data

[63] Continuation-in-part of Ser. No. 365,443, Dec. 28, 1994, abandoned.

[51] Int. Cl.$^6$ ............................. G01T 1/20; G02B 6/26
[52] U.S. Cl. ........................ 385/15; 250/367; 250/368; 385/120
[58] Field of Search ...................... 385/15, 115, 116, 385/120, 121, 147, 901, 141–143; 250/361 R, 363.01, 363.07, 364, 367, 368, 369, 370.11, 390.11

[56] References Cited

U.S. PATENT DOCUMENTS

| | | | |
|---|---|---|---|
| 3,253,500 | 5/1966 | Hicks, Jr. | 385/120 |
| 3,617,743 | 11/1971 | Rabatin et al. | 250/214 VT |
| 3,967,123 | 6/1976 | Deylius et al. | 250/368 |
| 4,101,781 | 7/1978 | Neukermans et al. | 250/483.1 |
| 4,142,101 | 2/1979 | Yin | 250/363.01 |
| 4,264,408 | 4/1981 | Benham | 216/25 |
| 4,415,810 | 11/1983 | Brown, Sr. | 250/487.1 |
| 4,591,232 | 5/1986 | Jeskey | 385/120 |
| 4,654,558 | 3/1987 | Obata et al. | 385/120 X |
| 4,931,647 | 6/1990 | Hiruma et al. | 250/368 |
| 4,946,238 | 8/1990 | Sashin et al. | 385/116 |
| 4,975,583 | 12/1990 | Spowart | 250/364 |
| 5,108,959 | 4/1992 | Buchanan et al. | 501/50 |
| 5,120,970 | 6/1992 | Buchanan et al. | 250/483.1 |
| 5,122,671 | 6/1992 | Buchanan et al. | 250/483.1 |
| 5,168,540 | 12/1992 | Winn et al. | 385/141 X |
| 5,302,423 | 4/1994 | Tran et al. | 427/555 |
| 5,420,959 | 5/1995 | Walker et al. | 385/143 |
| 5,461,233 | 10/1995 | Yamamoto et al. | 250/368 |

OTHER PUBLICATIONS

G.Y. Fan, Cliff Bueno, Dana Dunkelberger & Mark Ellisman, "Performance Characteristics of Radioluminescent Fiber Optics as Electron Scintillators", J. Electron Microsc. 42: 419–423 (Year date listed on paper:1993) (Date of Publication: Apr. 4, 1994).

Daniel O'Mara et al., "Design Criteria and Development of Components for a Modular CCD–based Detector for X–ray Crystallography", SPIE vol. 1656, High–Resolution Sensors and Hybrid Systems (Feb. 1992), pp. 450–456.

C. Bueno et al., "Luminescent Glass Design for High Energy Real–Time Radiography", SPIE vol. 1327, Properties and Characteristics of Optical Glass II (Jul. 1990), pp. 79–91.

Zanella et al. "X–ray Imaging with Scintillating Glass Optical Fibers", Nuclear Inst. and Methods in Physics Research A287 (No Month 1990), pp. 619–627.

*Primary Examiner*—John D. Lee
*Attorney, Agent, or Firm*—Feix & Feix; Henry Groth

[57] ABSTRACT

An improved hybrid luminescent device and method for converting penetrating radiation energy into visible light for imaging applications. The hybrid luminescent device includes a phosphor screen disposed on an entrance face fiber optics scintillator which, in turn, may be removably coupled to a camera or like recording media. The hybrid luminescent device of the present invention is capable of providing enhanced radiation absorption efficiency, higher spatial resolution and enhanced brightness or luminescence output over that which is achievable by the phosphor screen and/or fiber optics scintillator when used separately as an intensifying screen for imaging of ionizing and/or penetrating radiation.

19 Claims, 14 Drawing Sheets

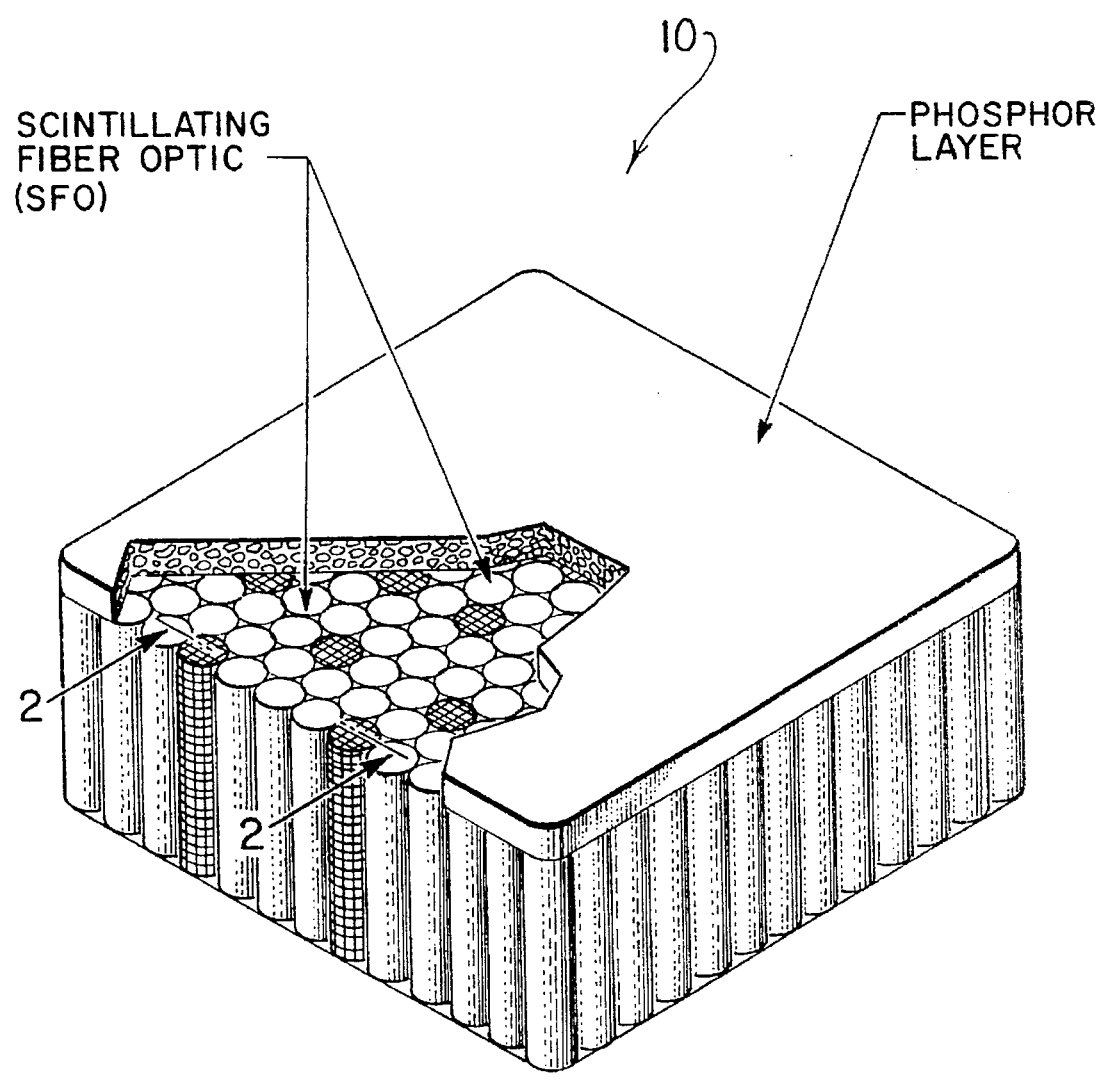
FIG_1

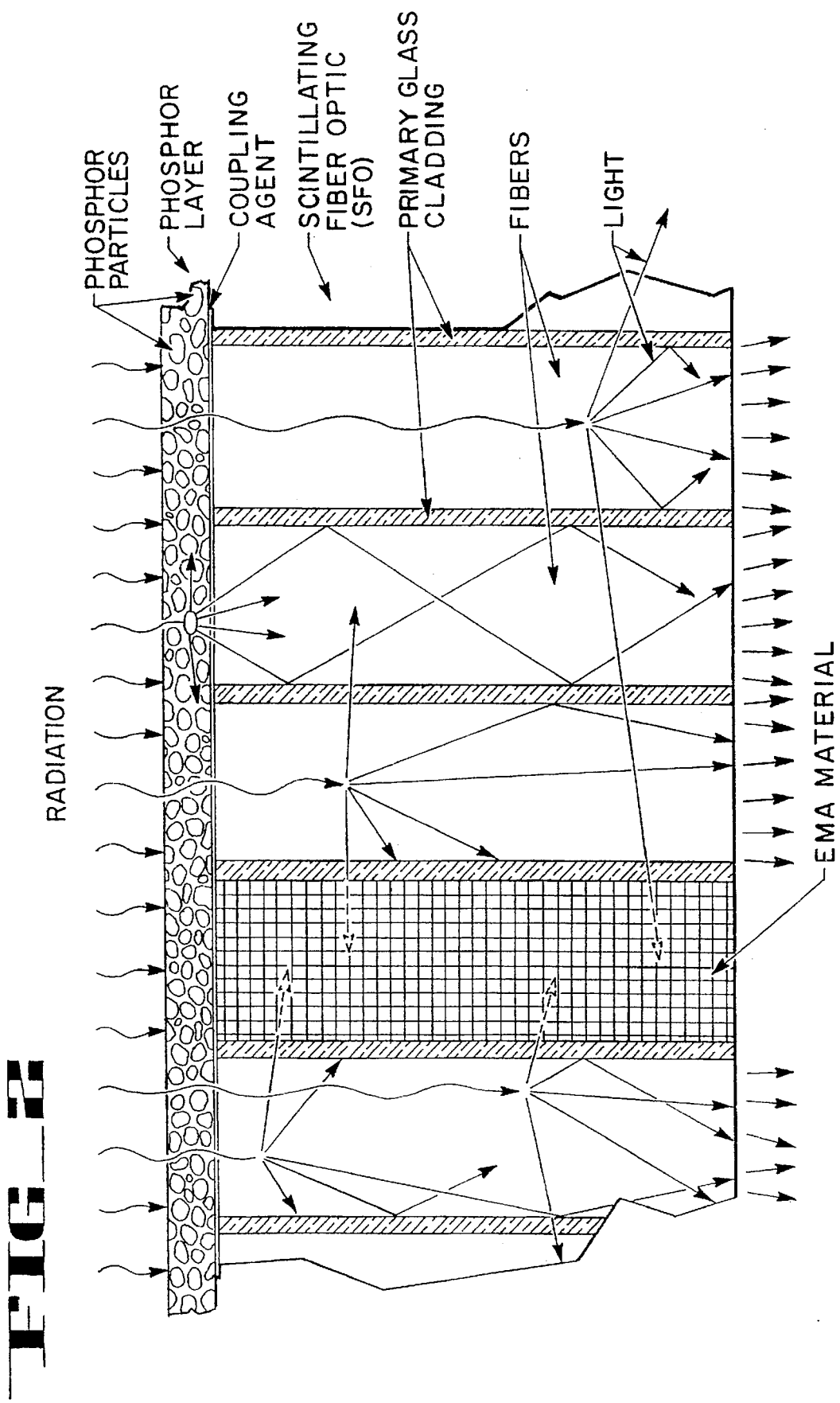
FIG_2

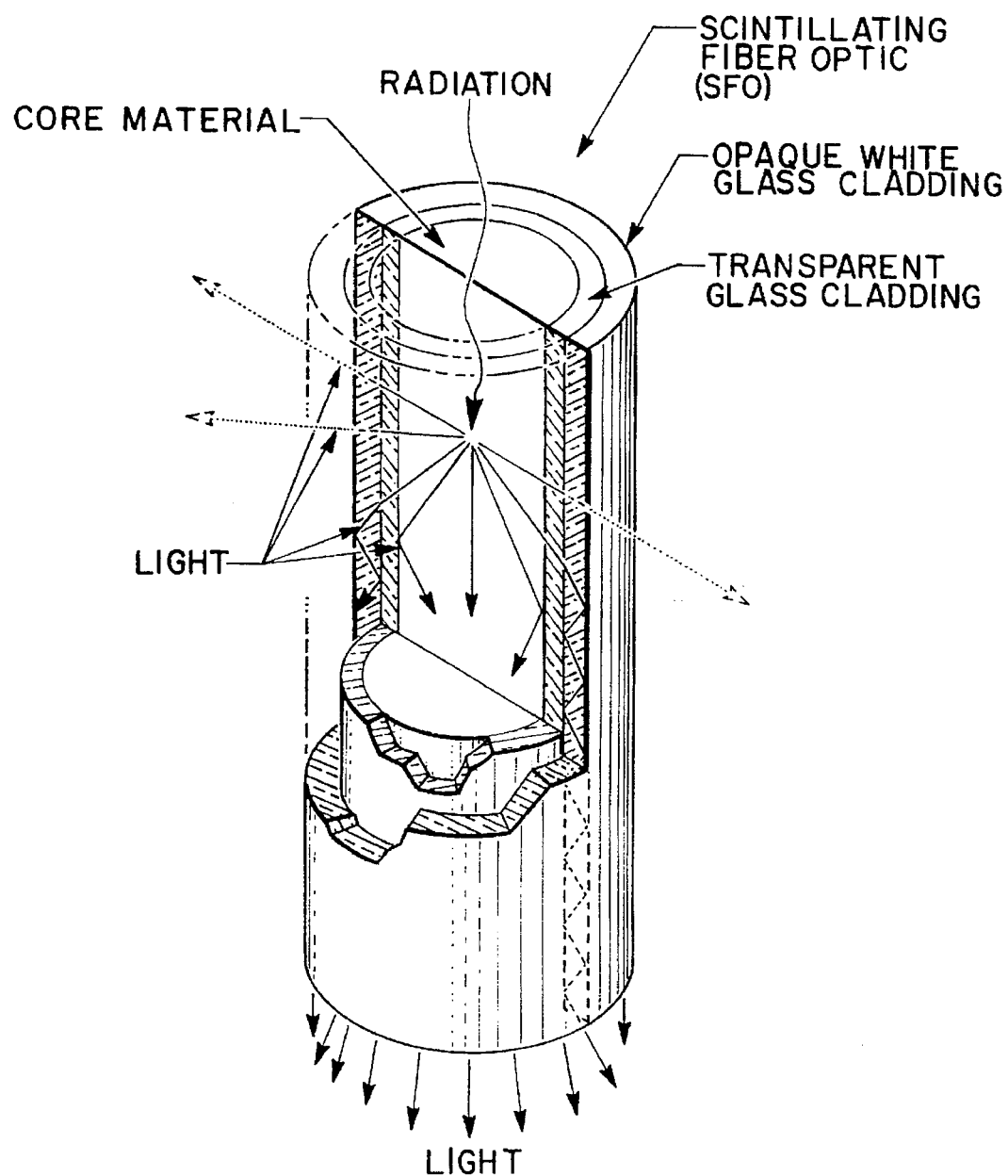

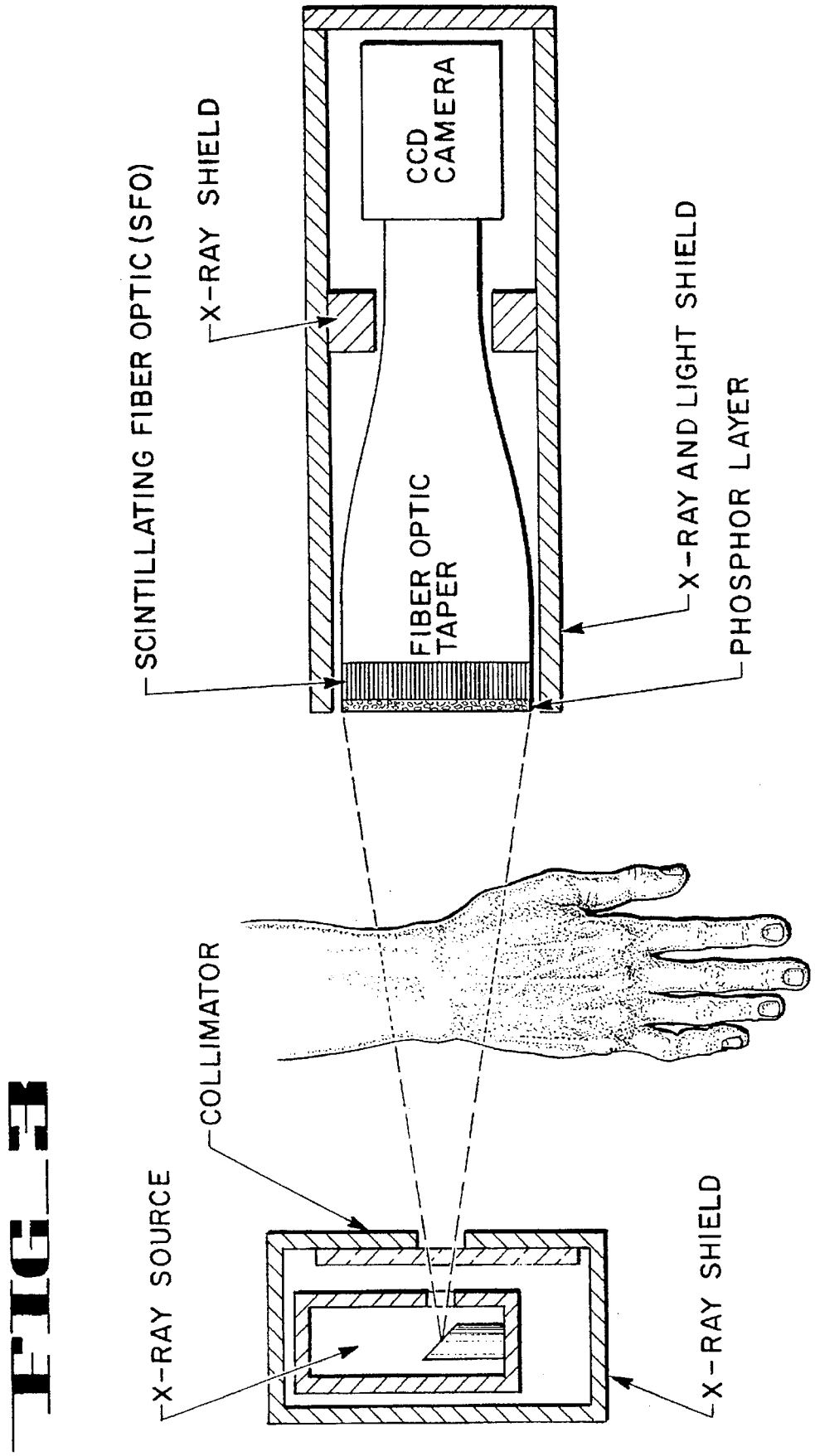

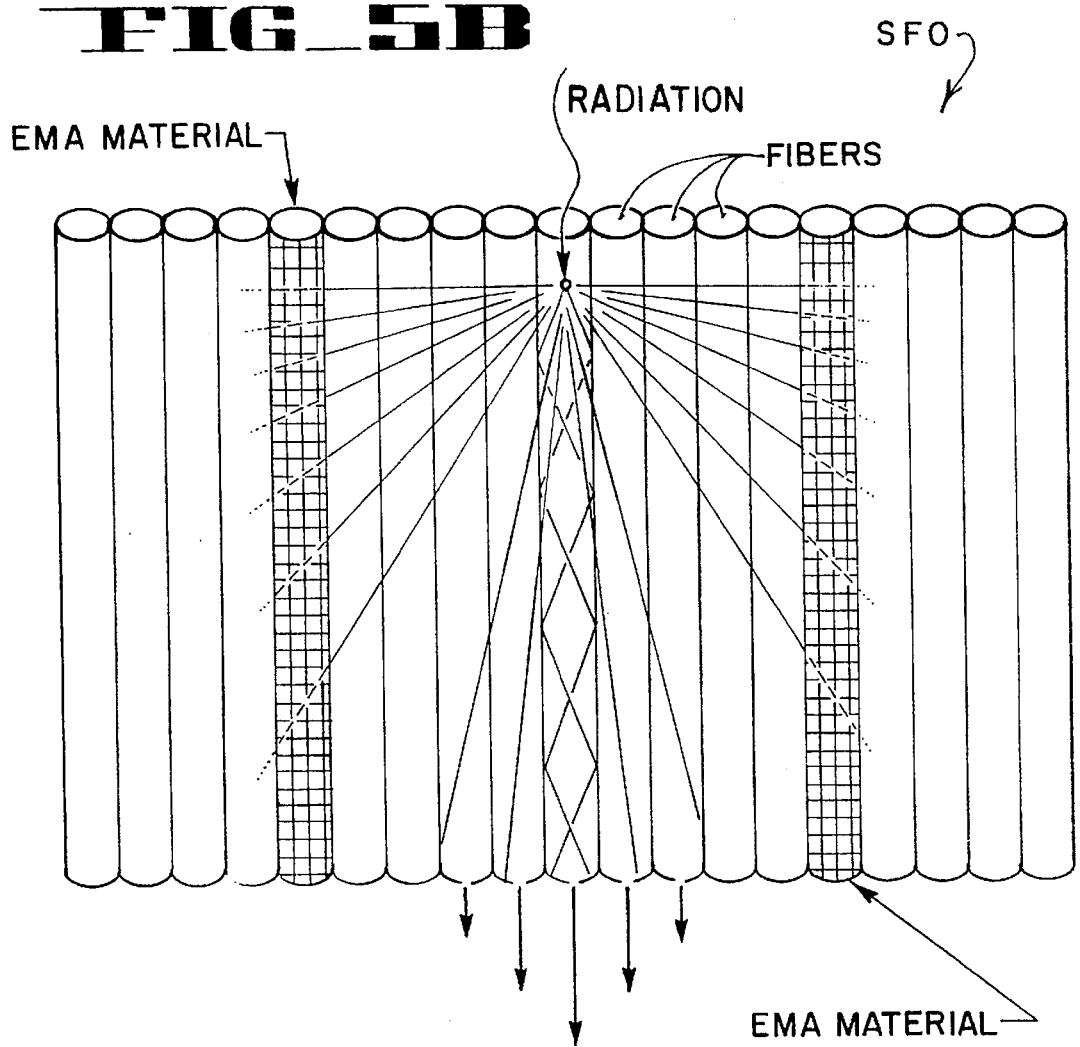
FIG_5B
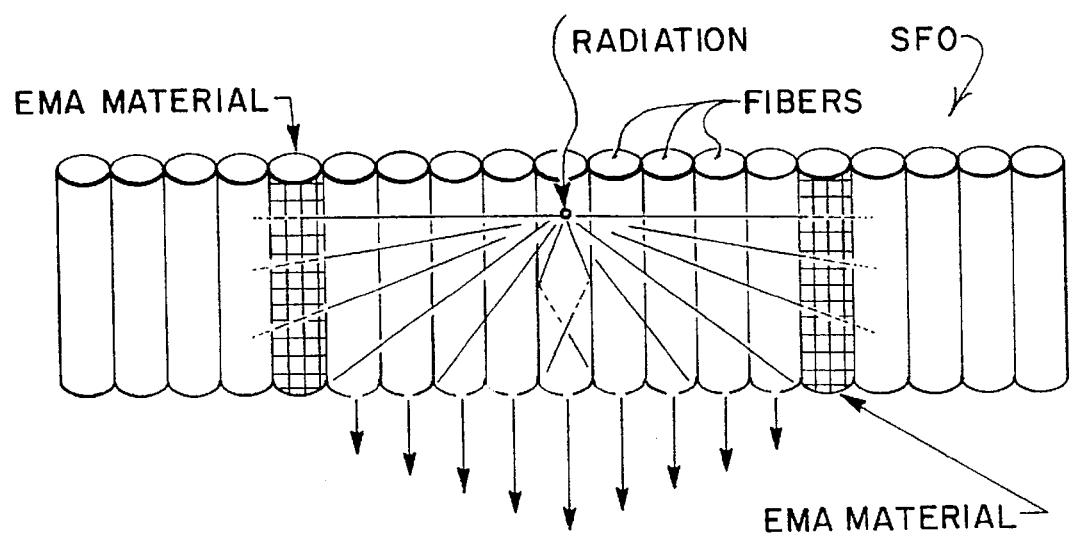
FIG_5A

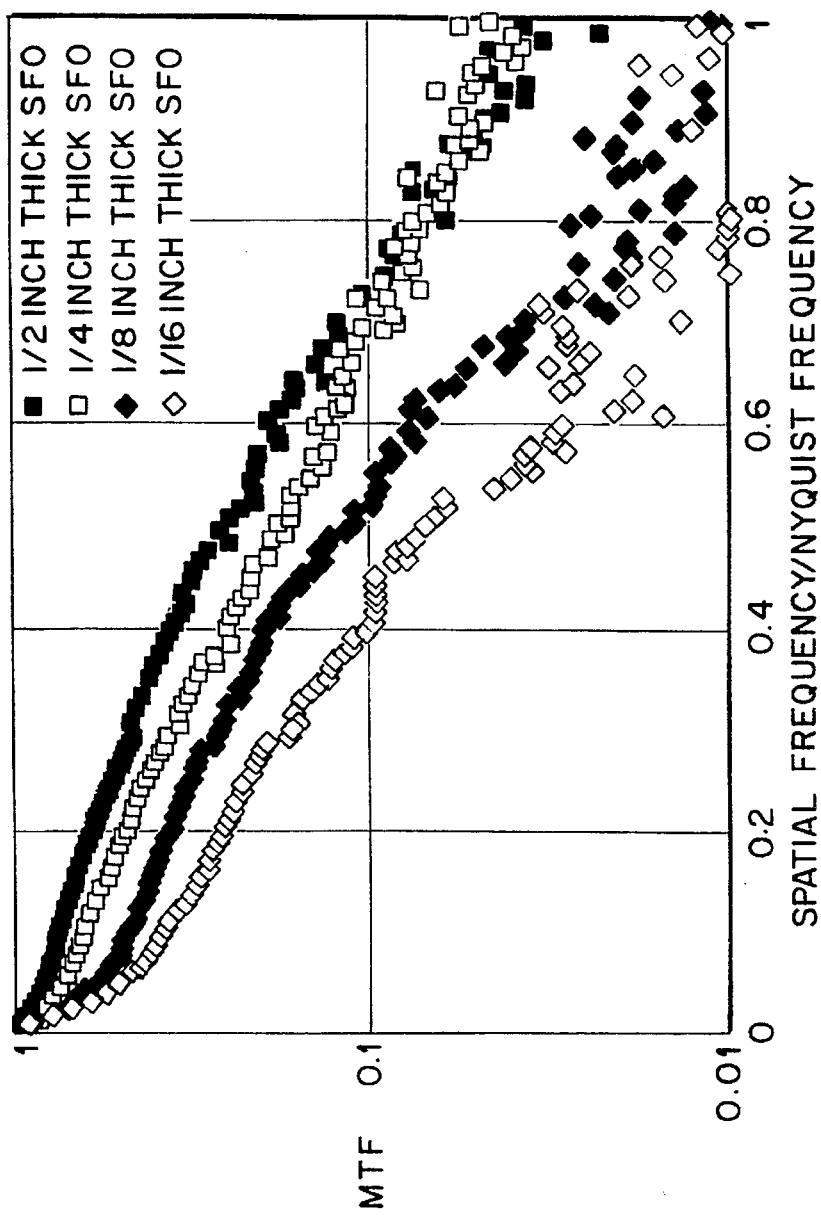

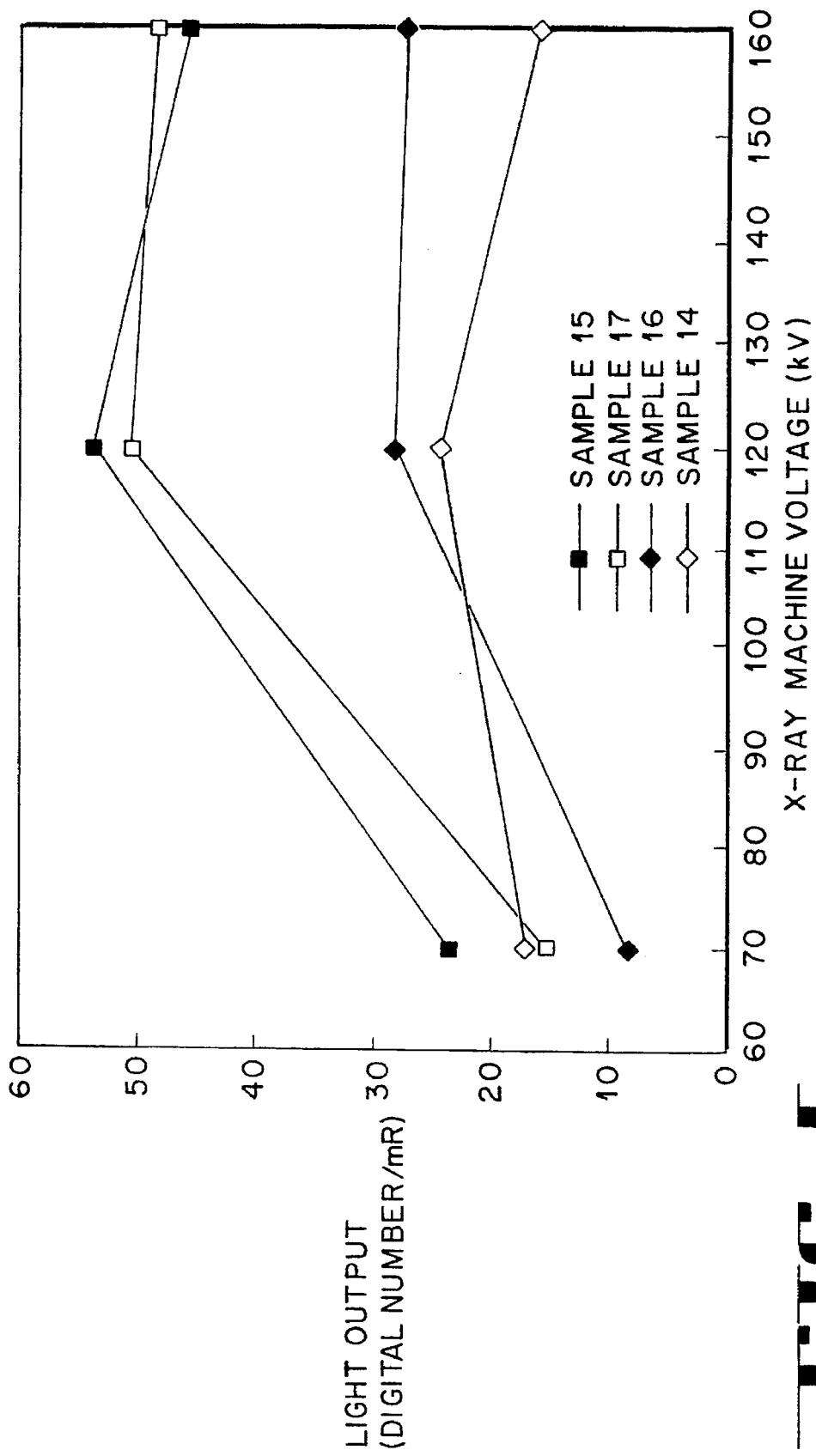
FIG_5

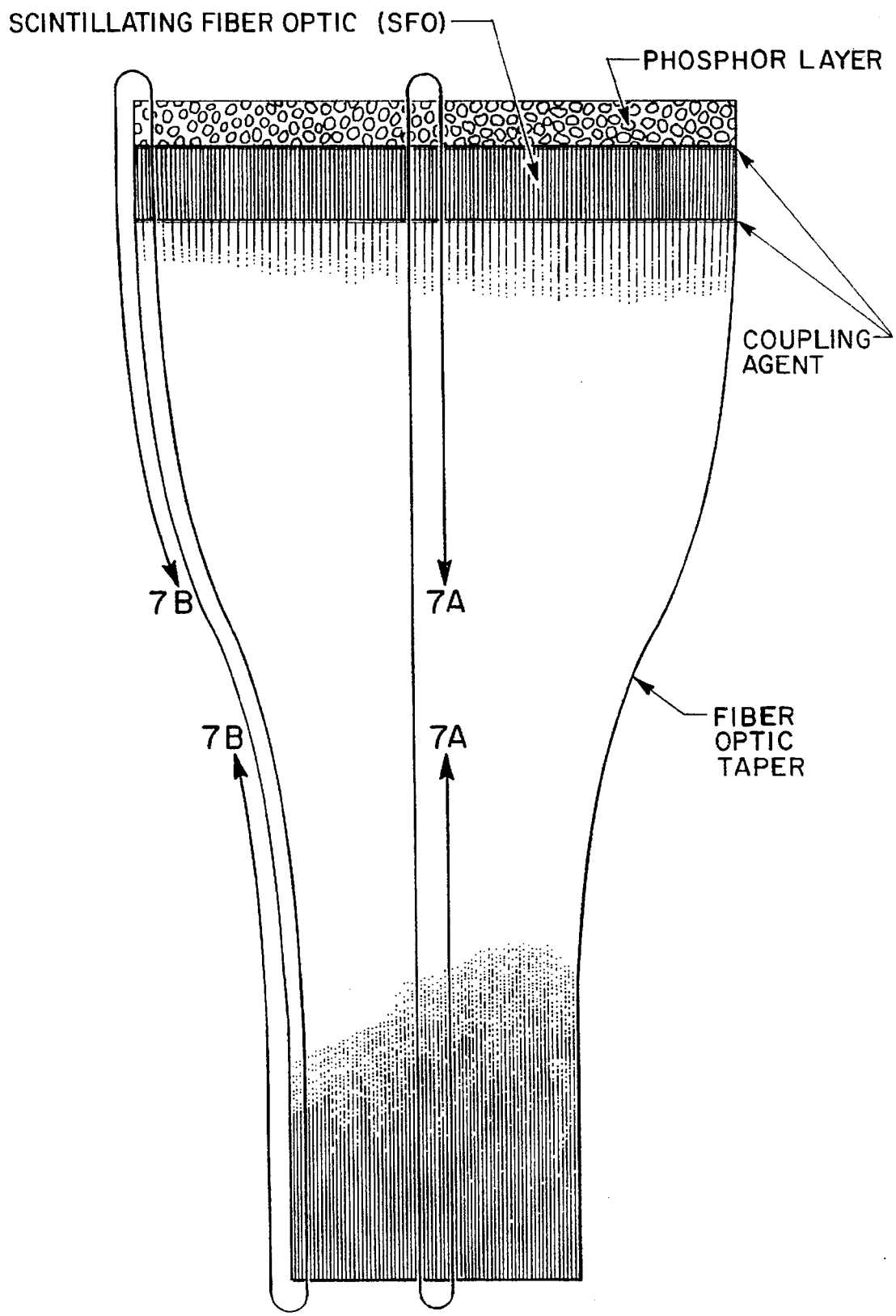

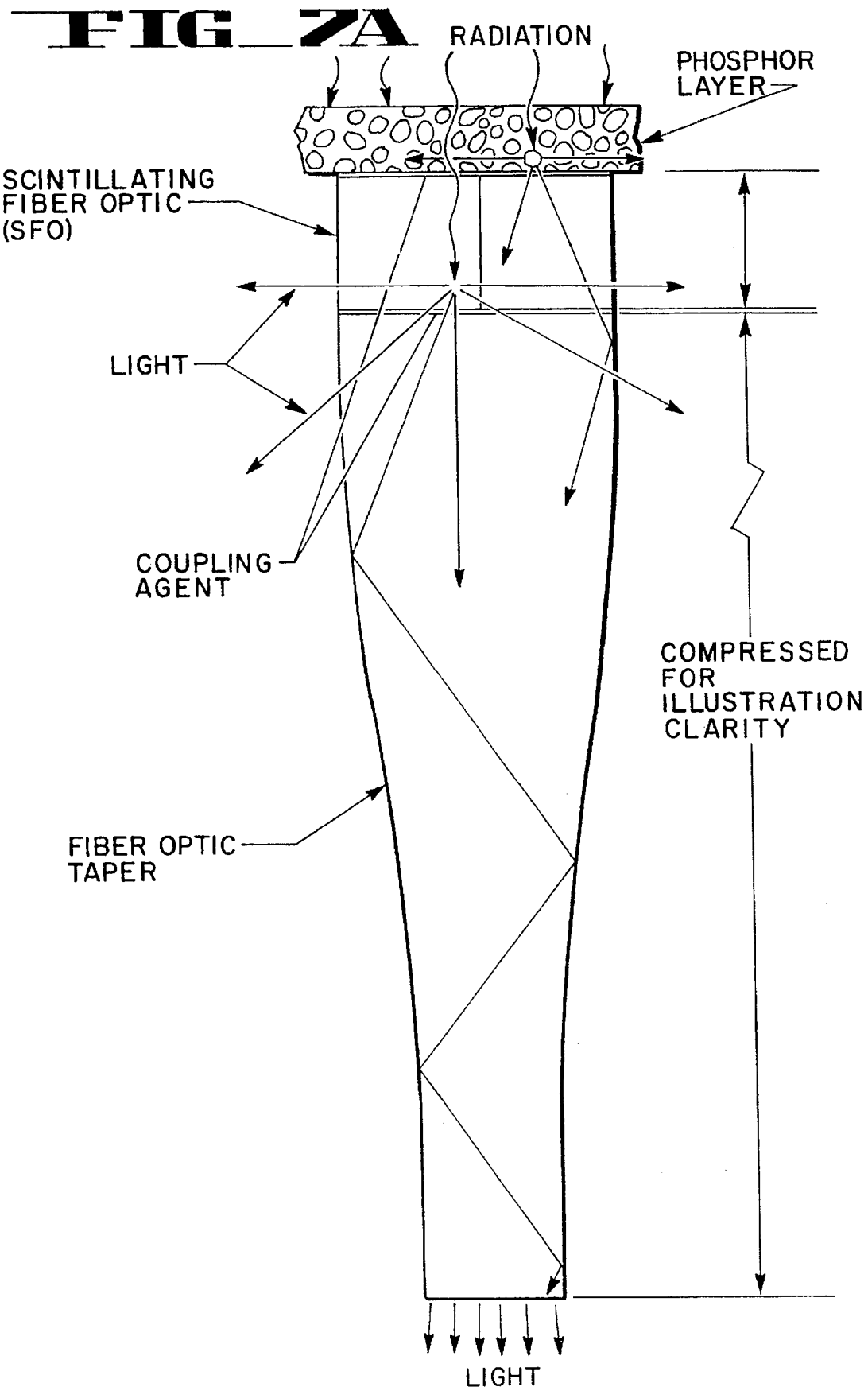

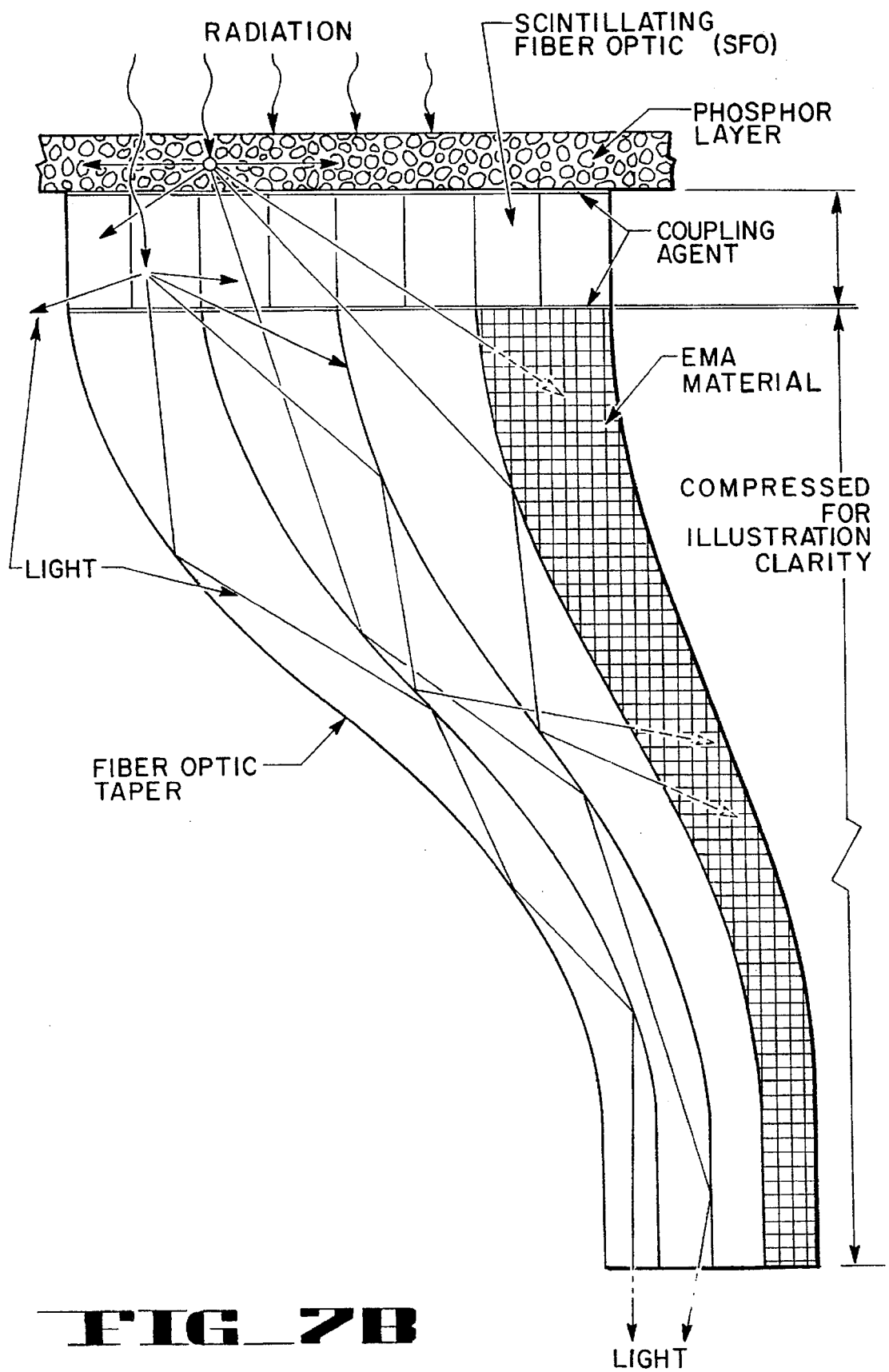
FIG_7B

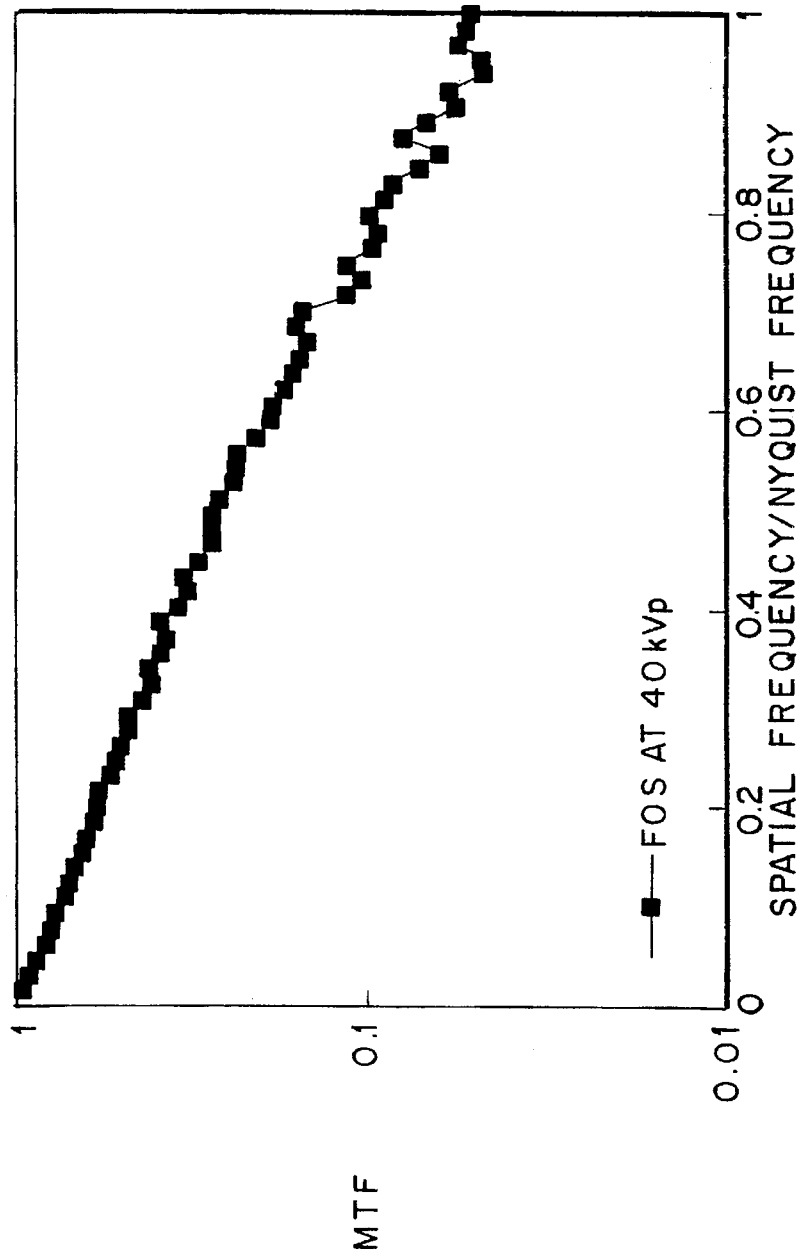
FIG_7C

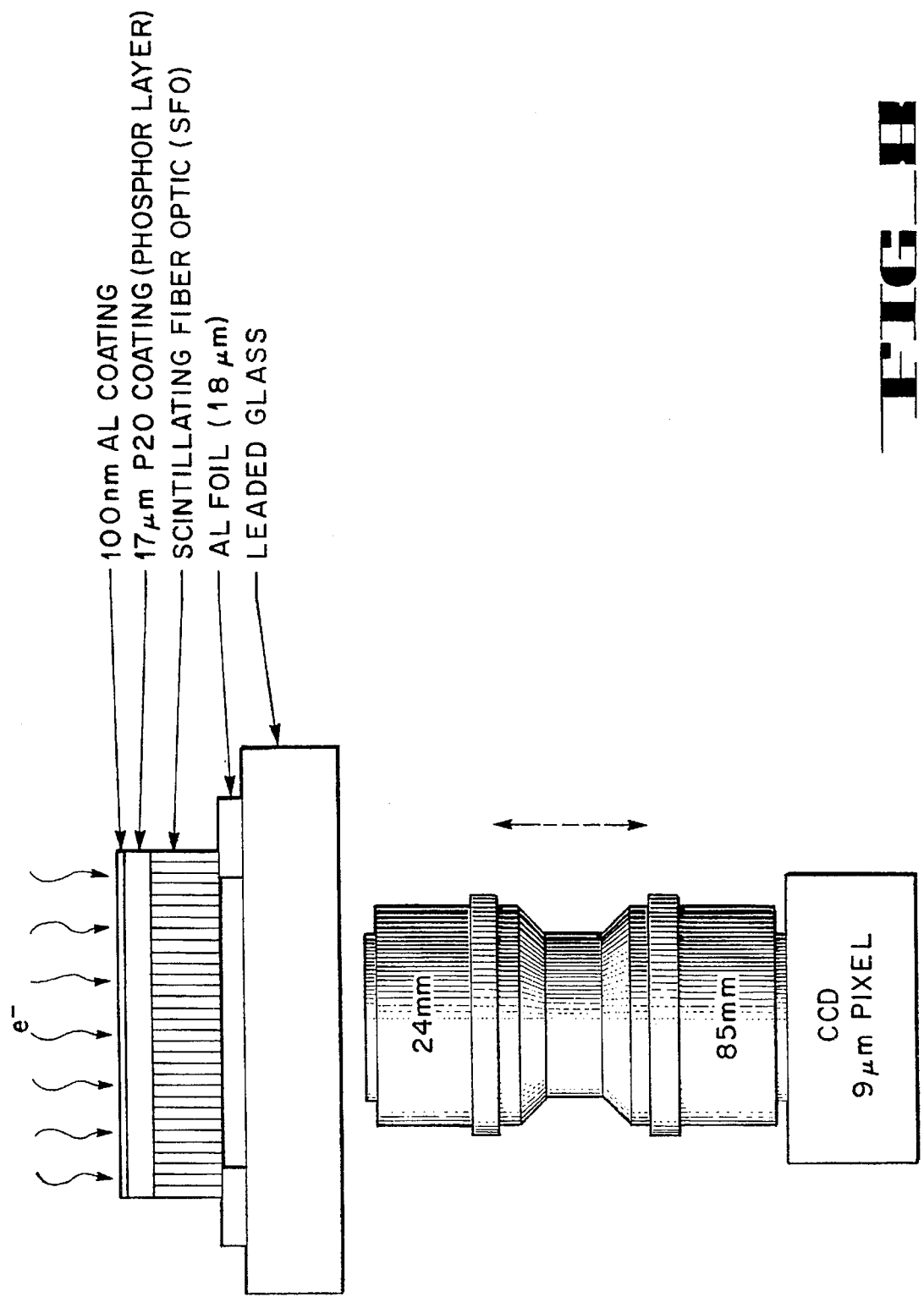

HYBRID LUMINESCENT DEVICE AND METHOD FOR IMAGING PENETRATING RADIATION

CROSS REFERENCES TO RELATED U.S. APPLICATIONS

This application is a continuation in part of abandoned application Ser. No. 08/365,443 filed Dec. 28, 1994 and entitled "Hybrid Luminescent Device For Imaging of Ionizing and Penetrating Radiation", Clifford Bueno, Robert A. Betz, Mark H. Ellisman, Gary G. Y. Fan, inventors.

FIELD OF THE INVENTION

The present invention relates to luminescent devices for use in imaging penetrating radiation such as x-rays, gamma-rays, neutrons, ions, electrons and the like. More particularly, the present invention relates to improvements in the contrast sensitivity and resolution of a hybrid luminescent device of the type which includes a thin phosphor screen and a thick screen fiber optics scintillator.

BACKGROUND OF THE INVENTION

In the field of radiation detection and imaging it is well known to use so called intensifying screens that contain luminescent material for converting the invisible penetrating radiation into visible light. The light produced by the luminescence of the penetrating radiation in the intensifying screen can then be made available for detection on film or by other electronic light-sensitive detector means such as a CCD (charged coupled device), photocathode or photodiode.

For example, in x-ray imaging applications, the intensifying screen will contain x-ray luminescent material, typically a thin layer of phosphor particles. The particular phosphor composition selected will be determined in accordance with the desired selected x-ray application in order to emit a relatively large number of light photons for each x-ray photon which strikes a phosphor particle in the phosphor layer.

It is desirable that the phosphor layer or intensifying screen exhibit good brightness or light output, good radiation absorption efficiency and good spatial resolution.

For medical x-ray applications in particular, the design of such intensifying screens has involved a trade-off between screens of large thickness, which result in increased luminescent radiation for a given x-ray level, but which also produce decreased image sharpness, and screens of less thickness, which result in improved image sharpness relative to the thicker screens, but which also require more x-ray radiation to produce acceptable film images, thereby increasing the x-ray dosage to which the patient must be exposed. In practice, the thicker or high speed screens are utilized in those applications which do not require maximum image sharpness, thereby reducing the patient exposure to x-rays, while thinner or medium speed and slow speed screens are utilized when increased image resolution is required. These latter screens employ thinner phosphor layers and may incorporate dyes to minimize transverse propagation of light by attenuating such rays more than a normal ray which travels a shorter path. In general, thinner or slow speed screens require approximately 8 times the x-ray dosage of thicker high speed screens.

There are many applications in medical x-ray imaging, industrial x-ray imaging and x-ray crystallography, among other disciplines, where spatial resolution must remain high. Heretofore, good resolution x-ray screens which have a radiation absorption efficiency upwards of 90%–100% simply did not exist, since 100% radiation absorption efficiency for thin phosphor screens have been generally thought impossible to achieve.

In accordance with the known practice, phosphors are coupled directly to radiographic film for use in medical x-ray imaging. It is also well known in the art to deposit a phosphor layer on a fiber optic face plate which, in turn, is directly coupled to a CCD camera. The fiber optic face plate functions as a light guide for channeling the light photons produced in the phosphor layer to the detector of the CCD.

Such electronic devices as CCDs are sensitive to direct penetrating radiation. Direct incidence of penetrating radiation onto CCDs will cause additional noise in the image and over time damage such devices by forming traps that result in reduced charge transfer efficiency and higher dark current.

The use of a phosphor deposited directly onto a CCD, i.e., without any fiber optic device, therefore has very limited applications. The phosphor frequently does not provide the shielding required to protect the CCD from radiation damage and keep the noise low from direct excitation of the radiation onto the CCD. Normally, this results in severe speckle noise which fogs the optical image that is deposited onto the CCD. This, as stated above, severely limits the lifetime of the CCD. In summary, direct imaging onto a CCD is possible, but it is not recommended with the combined use of a phosphor. A phosphor deposited onto a fiber optic device which is bonded to a CCD will provide shielding, but will have a relatively low conversion of radiation into light.

Accordingly, it would be desirable to be able to provide a luminescent device which combines the shielding capabilities of a fiber optic device and the brightness and good spatial resolution capabilities of a thin phosphor screen.

Various patents have proposed techniques for fabricating a phosphor layer which has both good resolution and enhanced brightness. The basic approach taken by the prior art has been directed to methods for depositing the active phosphor particles in an array of cells or pixels which are separated by wall members that are disposed generally parallel to the direction of x-ray travel. See for example, U.S. Pat. No. 5,302,423. The purpose of the wall members is to reflect light emitted by the pixelized phosphor particles and thereby prevent scattered light from reaching the detection means and contributing to a foggy image. Such pixelization techniques, however are complex and expensive and still require additional phosphor layer thickness to ensure a desired level of radiation absorption efficiency.

A radioluminescent or scintillating fiber optic is a special type of fiber optic material which has a core glass containing the rare earth element terbium. When activated by ultraviolet light, x-rays, or ionizing particles, terbium fluoresces in the green and peaks at a wavelength of 550 nm. Therefore, a face plate made of this type of fiber optic material can be used both as a scintillator as well as a light guide, and has been employed primarily in medical and non-destructive imaging as x-ray scintillators.

Scintillating fiber optic plates can be made thick in order to provide up to 100% radiation absorption efficiency without significant degradation in spatial resolution. This occurs because of the non-particle, low scatter, channeling nature of this type of luminescent device. While conventional scintillating fiber optic plates provide good radiation absorption efficiency and high spatial resolution, it would be desirable to be able to improve the brightness of such luminescent devices.

This goal was achieved in abandoned application Ser. No. 08/365,443 which discloses a hybrid luminescent device for imaging penetrating radiation that combines the brightness or strong luminescence output under penetrating or ionizing radiation and good spatial resolution capabilities of a thin phosphor screen and the radiation absorption efficiency and high spatial resolution of a thick screen, fiber optic scintillator.

A thin intensifying screen or phosphor layer typically has a higher index of refraction than a scintillating fiber optic face plate. Due to the differences in the index of refraction of these two luminescent devices, light refraction light scattering and back reflection of light will occur at the interface between these two luminescent devices. This results in an overall degradation of contrast sensitivity and resolution. This problem is made worse if there is any air gap present at this interface since air has a much higher index of refraction then either of the luminescent devices. Accordingly, it would be desirable to couple the two luminescent devices in an air free manner. It would also be desirable to be able to closely match the refractive indexes of the respective luminescent devices along their common interface.

SUMMARY OF THE INVENTION

It is a related priciple of the present invention to provide methods and apparatus for improving the contrast sensitivity and resolution of such hybrid luminescent devices.

A hybrid luminescent device as disclosed here combines a thin phosphor layer disposed directly on an input face of a relatively thick screen, scintillating fiber optic (SFO) face plate.

The present invention thus reduces the interdependency of spatial resolution and absorption efficiency of the phosphor screen. In this invention, the high spatial resolution of a thin phosphor screen can be combined with a highly absorbing luminescent material to provide a combination which exhibits superior spatial resolution and brightness over the phosphor material alone. The result is a high spatial resolution, highly absorbing, high light output scintillating device.

As a consequence, the hybrid luminescent device of the present invention can provide higher radiation absorption efficiency, thereby providing improved signal statistics over the prior art. This increased absorption efficiency is also important in providing shielding to an electronic light detection device on the opposite side of the screen away from the radiation. Therefore, in applications where it is appropriate to couple phosphor screens or deposit phosphor particles onto a non-scintillating fiber optic imaging conduit like those now used in digital x-ray imaging systems, improvements in luminescence yield and radiation absorption efficiency will be obtained when a similar layer thickness of phosphor is used on the radiation input surface of a scintillating fiber optic device.

The hybrid luminescent device disclosed herein can be coupled directly onto a front-illuminated CCD or a back-illuminated CCD, and can be configured to provide the appropriate radiation shielding well into the million volt energy range of the penetrating or ionizing radiations to provide a device that will provide very high sensitivity.

Alternatively, the hybrid luminescent device of the present invention can be coupled to a camera or light recording device directly, such as a photocathode, or it can be coupled through a lens to a camera to either a CCD or photocathode.

We have found that certain coupling agents, such as commercially available optical coupling fluids and optical epoxies are useful in coupling the two luminescent devices in an air free manner. We have also found that the refractive index of the coupling fluid can be selected to closely match the refractive indexes of the respective luminescent devices in order to contain refraction and light spreading and thereby enhance collimated light transmission through the hybrid luminescent device.

Further still, another alternative is to place the hybrid luminescent device onto a fiber optic image conduit or image taper (demagnification device) that is already attached to a CCD, other electronic sensor or as input into an image intensifier tube. This device configuration advantageously offers the benefit of greater flexibility for interchanging phosphor screens of different compositions, densities and/or thickness for different applications without the risk of damaging the CCD or other electronic sensor. The fiber optic taper also filters stray light which would otherwise reach an unintended remote pixel location on the CCD and cause poor resolution and contrast.

The hybrid luminescent device of the present invention also captures a larger percentage of photons from penetrating radiations. Therefore, for a given exposure of radiation, use of this invention will provide improvements in image quality over the prior art. Conversely, for a similar image quality, lower levels of radiation can be used to provide safer exposure levels. The invention will advantageously provide improved medical diagnosis through the combination of improved image quality and lower patient dose. The lower patient dose will allow more frequent intervals of testing to monitor possible onset of cancers in risk cases.

A further improvement of the present invention involves incorporating an opaque white glass outer cladding layer around the individual fibers of the scintillating fiber optics face plate. This outer cladding layer advantageously captures a greater percentage of stray light that exits a particular fiber core and channels it to the exit face of the hybrid luminescent device to provide increased luminescence output at a desired pixel location.

The present invention will also provide improved nondestructive inspections and enhanced crystal structure determinations, basically for the same reasons of enhanced image quality and reduced exposures (higher throughput) as described above. Higher x-ray inspection throughput is also an important consideration for efficient on-line process monitoring.

Another advantage of the present invention is that the combination of the two luminescent devices provides enhanced signal capability, which is especially advantageous for use in the field of transmission electron microscopy. The enhanced signal results in improved signal to noise ratios which will allow investigators the opportunity to improve discrimination among features during an examination. In general, all of these benefits can result in social gains in terms of improved health care, enhanced efficiency and improved product development (fewer rejects, less waste).

Methods and apparatus which incorporate the features described above and which function as described above constitute specific objects of this invention.

Other and further objects of the present invention will be apparent from the following description and claims and are illustrated in the accompanying drawings, which by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

BRIEF DESCRIPTION OF THE DRAWING VIEWS

FIG. 1 is an isometric view of the hybrid luminescent device of the present invention which includes a thin phosphor screen and a thick fiber optic scintillator.

FIG. 2 is a sectional view taken along the line and in the direction of arrows 2—2 of FIG. 1.

FIG. 2A is an enlarged isometric view of a single scintillating optical fiber constructed in accordance with a second embodiment of the present invention.

FIG. 3 is a schematic illustration showing a measurement set up for testing the hybrid luminescent device of the present invention for use as an x-ray scintillator.

Figure 4:
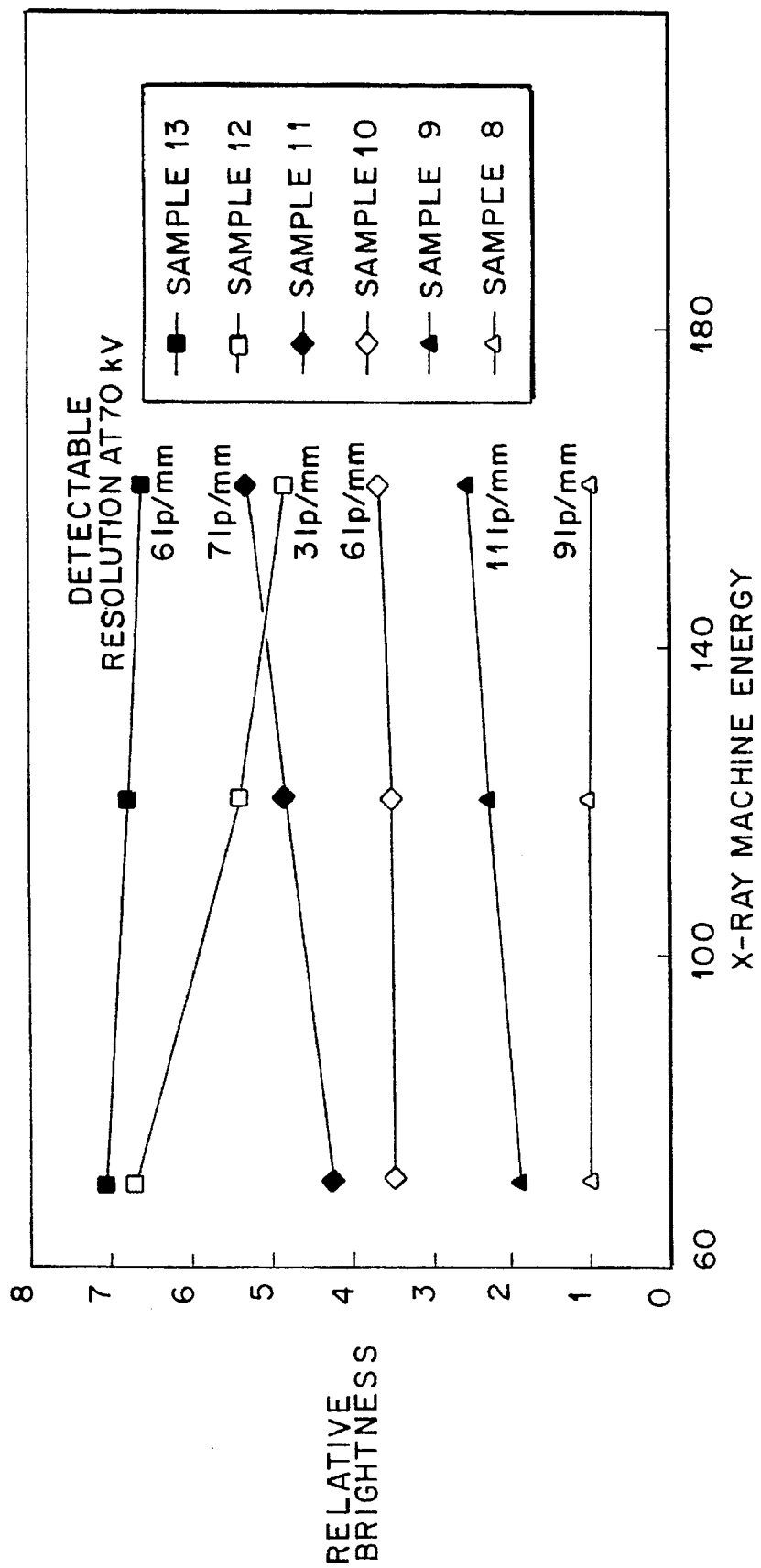

FIG. 4 is a graph which plots luminescence output or brightness for several embodiments of the invention (samples 9, 11, and 13) as a function of x-ray energy. Brightness values for prior art luminescent devices (samples 8, 10, and 12) are shown for comparison.

FIG. 5a is a sectional view through a thin fiber optic scintillator face plate which shows a larger percentage of stray light at the exit face.

FIG. 5b is a sectional view through a thick fiber optic scintillator face plate which illustrates how an increase in the thickness of the face plate can result in more effective filtering of stray light.

FIG. 5c is a graph which plots the modulation in the signal for an edge function as a function of spatial frequency for scintillating fiber optic face plates of varying thickness showing how the spatial resolution and modulation improves as the thickness of the scintillating fiber optic face plate is increased.

FIG. 6 is a graph which plots normalized luminescence output (brightness) of the invention (sample 15) as a function of x-ray energy. Luminescence output curves for other prior art luminescent devices (samples 14, 16 and 17) are shown for comparison.

FIG. 7 is a front elevation view showing the hybrid luminescent device mounted on a fiber optic taper.

FIG. 7A is an enlarged view of the region encircled by Arrows 7A—7A of FIG. 7.

FIG. 7B is an enlarged view of the region encircled by Arrows 7B—7B of FIG. 7.

FIG. 7C is a graph which plots the Modulation Transfer Function verses spatial frequency of a scintillating fiber optic face plate mounted on a fiber optic taper.

FIG. 8 is a schematic illustration showing a measurement set up for testing the hybrid luminescent device of the present invention for use as an electron scintillator.

Figure 9:
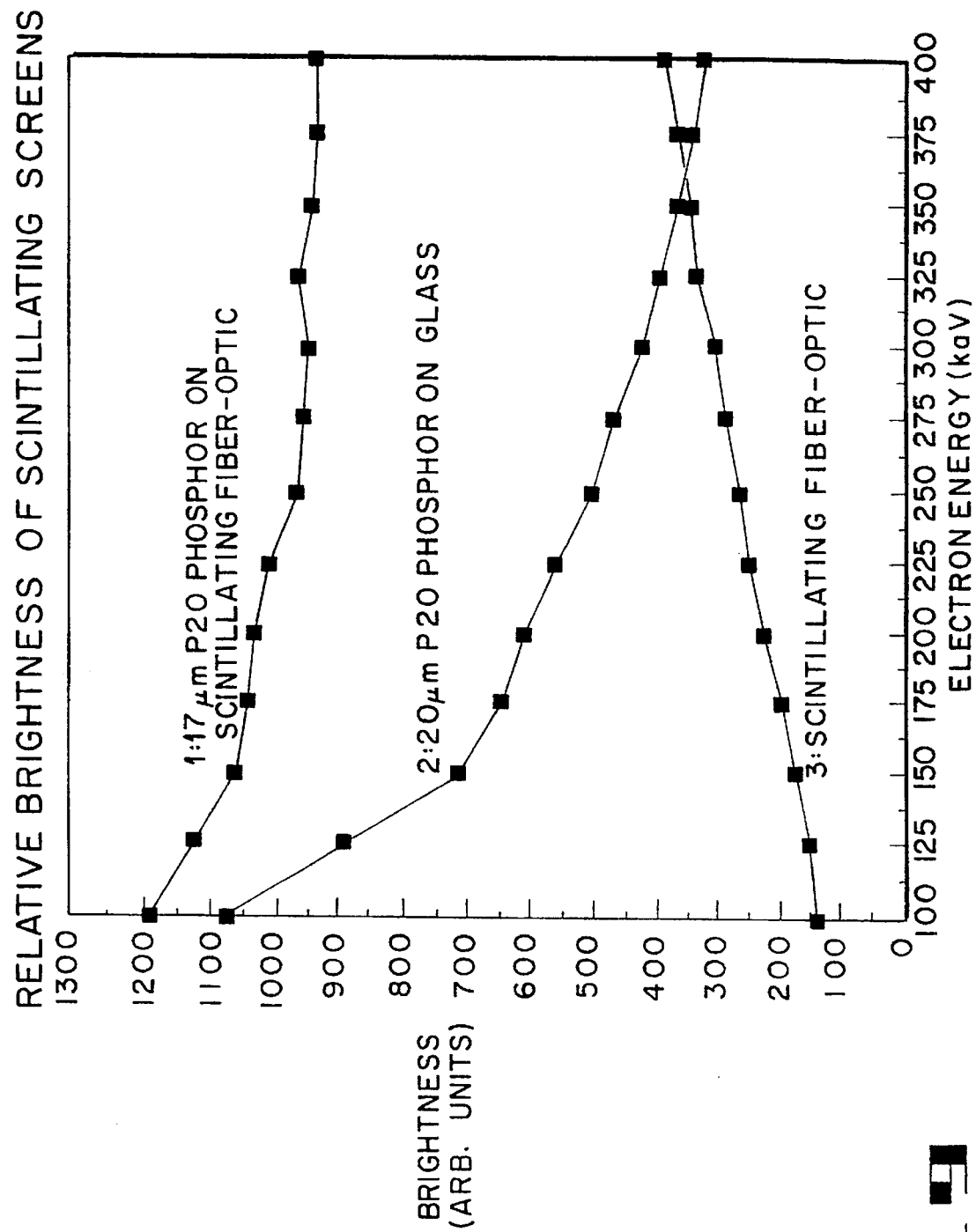

FIG. 9 is a graph showing the relative brightness of a scintillating fiber optics (SFO) face plate with a 17 μm P20 ((ZnCd)S:Ag)phosphor coating (curve 1); a 20 μm P20 ((ZnCd)S:Ag) phosphor coating on glass (curve 2); and a SFO without a phosphor coating (curve 3).

DETAILED DESCRIPTION OF THE PREFERRED EMBODIMENTS

A hybrid luminescent device in accordance with one embodiment of the present invention is generally designated by reference numeral 10 in FIG. 1. The hybrid luminescent device 10 is specially constructed to capture and convert penetrating or ionizing radiation into light that is detectable by a sensing or recording medium.

The hybrid luminescent device 10 consists of a thin screen phosphor layer attached to a thick screen scintillating fiber optic face plate (herein referred to as "SFO"). The SFO is composed of a non-crystalline amorphous substance such as inorganic glass or plastic luminescent material, with inorganic glass being a preferred luminescent material.

Especially suitable scintillating fiber optic glasses for use in the present invention include; terbium-activated silicate luminescent glasses as disclosed in U.S. Pat. No. 5,122,671; terbium-activated borate luminescent glasses as disclosed in U.S. Pat. No. 5,108,959; and the cerium-activated, lithium enriched luminescent glass composition as disclosed in U.S. Pat. No. 4,415,810. Such luminescent glass compositions as noted above are preferred over crystalline scintillating fiber optic material since glass fibers can be formed much longer and with more compact spacing as compared to grown crystal scintillating fiber optic material. The luminescent glass material also provides over a twofold increase in spatial resolution as compared to crystalline scintillating fiber optic material.

As is best seen in FIG. 2, the SFO is fashioned into an array of many parallel glass fibers. Fibers may range in diameter from about 3 μm to about 3 mm with 10 μm fibers being preferred in a single plate. The fibers have a fiber core of a first given refractive index and are each surrounded by a primary cladding layer of a second, lower refractive index such that each fiber will trap light that is produced in that fiber from radiation-induced scintillations in its respective fiber core. The primary cladding layer comprises a transparent glass coating which has a low scattering coefficient to reflect back and channel light down through the fiber core.

The fibers also trap light which is produced by the radiation-induced scintillations in the overlying phosphor layer. In the fiber bundle, the light which is produced within each fiber and/or which is produced in the adjacent phosphor layer and is captured within each fiber is guided or channeled to the exit or output face of the SFO to produce a very sharp image plane corresponding to the various intensities of light produced by the absorbed penetrating radiation. For example, there is a linear relationship between the radiation absorbed and the light produced in both the phosphor layer or the SFO. The sharp image plane allows direct contact of the hybrid device 10 to a film or electronic sensor such as a CCD, photodiode or photocathode. The light will emit in each layer with a wavelength ranging from the ultraviolet to the near infrared based on the material host matrix and the luminescent activation employed or selected.

Preferable emission is from a glass fiber that emits green light as in U.S. Pat. No. 5,120,970.

The phosphor layer may be selected to match a preferred camera receptor such as a CCD. In the CCD case, green to red light is channeled through the SFO, at the same time green light is simultaneously produced in the SFO to provide optimal sensitivity. In the case of a photomultiplier or photocathode receptor, the preferred phosphor emission is from the near UV through the blue and the appropriate phosphor materials can be selected accordingly. In this case, the predominantly green emitting SFO can be used as in the CCD case since there are also emission bands that extend into the blue region. For a more in depth discussion of useful green and blue emitting luminescent glass compositions see C. Bueno, et. al. *SPIE* Vol 1327, "Properties and Characteristics of Optimal Glass II" (1990), pages 79–91.

Further examples of phosphor configurations that are useful with this invention are as follows. Phosphor particles ranging in size from submicron −50 μm in diameter, preferably 2–10 μm in diameter, may be deposited directly onto the SFO through a solvent and adhered with either an inorganic or organic binder, or conversely can be deposited by some other means such as a sputtering technique or through a vapor deposition process. There are several techniques known to those skilled in the art for depositing phosphors onto glass and fiber optic glass plates. This technology has been perfected for the military night vision image intensifier cameras and other image intensification devices.

The phosphor screen that is to be deposited onto the scintillating fiber optic need not be limited to a single phosphor material, but may consist of a mixture of phosphor materials to achieve the desired characteristics such as emission in the desired wavelengths or with the appropriate luminescent output.

The invention can also be achieved by a simple combination of commercially available phosphor screens onto the SFO plates. Commercial phosphor screens are typically composed of luminescent particles which are bonded to a flexible Mylar material. The commercial phosphor can be held in place either by a spring compression, via a coupling agent such as an optical epoxy or grease or by a host of other techniques known to those skilled in the art.

Interspersed throughout the fiber bundle of the SFO in a generally hexagonal pattern are individual fibers of extramural absorber (EMA) material. This is common art in the field of manufacture of fiber optic face plates. The EMA material preferably comprises opaque black or other dark color glass fibers. The EMA material reduces fiber to fiber light cross talk by absorbing stray light photons before they can reach the output face of the SFO. The stray light photons which are absorbed within the EMA material are designated by phantom arrows (see FIG. 2). By reducing cross-talk, the EMA material improves the spatial resolution and image contrast of the image at the exit or output face of the SFO. However, the brightness is also reduced as fewer light photons will reach the image plane at the exit or output face of the SFO.

FIG. 2A shows an individual glass fiber of the SFO wherein the inner fiber core material is surrounded by two cladding layers including the primary transparent glass cladding layer of FIG. 2 and a secondary or outer cladding layer in the form of an opaque milky white color glass coating. FIG. 2A illustrates one example of how the spatial resolution and image contrast of a conventional fiber optic scintillator can be improved.

When using fiber optics and especially scintillating fiber optics, a large portion of the light produced within each fiber core exits the fiber as stray light. If not contained (e.g., absorbed by the EMA material) the stray light will travel through the SFO and can eventually escape the SFO at the output face whereby it will illuminate remote pixels on the light receiving media disposed at the output face. This leads to a blurting or fogging effect on the recorded image. In order to restrict the migration of light from exiting each fiber core, an amorphous milky white substance can be drawn as an exterior cladding layer around the primary cladding layer much in the way the primary cladding layer is applied to the circumference of the fiber core upon manufacture. This opaque white glass, after a post anneal process will offer scattering centers to deflect and actually channel the light down this outer layer of glass cladding so that a halo of light originating from the fiber core will be trapped at a proximity not too distant from its origin. The resulting halo of light advantageously contributes to the fiber light intensity that is being presented to a particular pixel of the image recording media, (e.g. a CCD, a photocathode, a photodiode, etc.) The particular pixel is many times larger than the size of the individual overlying fibers so that the halo substructure of the fiber cladding combination is not detectable by the observer.

Even if light exits the surrounding milky white outer cladding, the next fiber will further reduce the path length of that ray so that contrast degradation can be substantially reduced.

Suitable materials for this outer cladding layer include any silicate based milky white glass such as those commonly used in the commercial bottle and cosmetics industry. Such glasses will match the characteristics required to meet the contrast enhancement properties desired. The opaque white glass does not need to have an index of refraction that exactly matches that of the inner core glass or the primary transparent glass cladding layer, but it does require a coefficient of thermal expansion which closely matches the thermal expansion coefficients for the primary cladding glass layer and inner core glass such that the inner core glass, primary glass cladding and secondary glass cladding can be drawn together.

Several examples are given to illustrate the preparation and characteristics of the hybrid luminescent device of the invention as well as methods and apparatus for enhancing contrast sensitivity and resolution. The following examples are to be construed as illustrative only and not limiting in any manner the scope and spirit of the invention as defined by the appended claims.

EXAMPLE 1

In this example, various combinations of commercial phosphor screens and scintillating fiber optics face plates were combined and tested for their suitability for use as x-ray screens. The various x-ray screen pair combinations were coupled to a CCD camera via a 1:3.31 non scintillating fiber optics taper. The measurement setup for the data contained in the following Tables 1, 2, and 3 is shown schematically in FIG. 3. The absorption efficiency is defined as the percent of incident radiation absorbed in the luminescent devices.

The brightness is defined as the level of light emitted after radiation is presented to the device.

The relative brightness is a value that is compared to a normal reference value of 1.

The spatial resolution is defined as the spatial response of the converted object pattern in the image domain. This is normally tested with alternating lines of high density and low density with a spacing (frequency) close to that expected for the response of the imaging system.

The highest frequency of these alternating lines represents the maximum spatial resolution of the system.

The brightness levels are measured directly by a wide linearity CCD device.

The absorption efficiency, A %, is calculated by the formula:

$$A\% = (1 - exp(-\mu x)) \times 100 \text{ at various energies of the penetrating radiation.}$$

TABLE 1

Absorption Efficiency relative brightness and spatial resolution of invention in relation to prior art
All data at 70 kV with an Aluminum HVL of 2 mm for an exposure of 100 mR
X-ray sensors coupled via Dow-Corning Optical grease # Q2-3067
Low noise CCD with on-chip integration used.
All X-ray exposures taken with Kevex 160 Microfocus X-ray source

| Smpl # | Fiber Optic | Thickness (mm) of fiber optic | Numerical Aperture[1] | Absorption Efficiency (%)[2] | Relative Brightness | Spatial Resolution[3] (lp/mm) |
|---|---|---|---|---|---|---|
| 1. | Non-scintillating fiber optic with Gd2O2S:Tb (50 mg/cm$^2$) | 5 | 1.0 | 27 | 1.0 | 9–10 |
| 2. | Scintillating fiber optic[4], no mirror, no phosphor overcoat | 7 | 0.6 | 85[5] | 0.66 | 10–11 |
| 3. | Scintillating fiber optic with mirror coating (Al) | 6.4 | 0.6 | 85[5] | 1.24 | 10–11 |
| 4. | Scintillating fiber optic with Gd2O2S:Tb (50 mg/cm$^2$) | 7 | 0.6 | 92 | 1.78 | 10–11 |
| 5. | Non-scintillating fiber optic with Gd2O2S:Tb (50 mg/cm$^2$) | 5 | 0.6 | 27 | 0.85 | 9–10 |
| 6. | Non-scintillating fiber optic with (ZnCd)S:Ag, Cu (100 mg/cm$^2$) | 5 | 1.0 | 18 | 8.09 | 3–3.5 |
| 7. | Scintillating fiber optic with (ZnCd)S:Ag, Cu (100 mg/cm$^2$) | 7 | 0.6 | 90 | 9.02 | 5–6 |

[1]$NA = (N_2^2 - N_1^2)^{1/2}$ where:
$N_1$ = Refractive index of the cladding material
$N_2$ = Refractive index of the core material
[2]Absorption efficiency computed for monochromatic 70 kV x-rays A (%) = 1 - exp (-μx) Attenuation coefficient computed using Harmonex X-ray, 1992.
[3]Spatial resolution maximum for this camera system is 10–11 lp/mm based on the demagnificaztion of the 15 μm pixels by the 1:3.31 taper resulting in an effective pixel size of ~50 μm at the input to the taper, or ~10 lp/mm.
[4]Based on U.S. Pat. No. 5,122,671
[5]The scintillating glass in this thickness absorbs 100% of the x-ray energy, however the thin cladding is inactive and reduces the effective absorption efficiency Table 1 compares the relative brightness levels and the spatial resolution of the invention (sample 4) in relation to prior art luminescence devices, samples 1–3 and 5. Sample 1 shows a high resolution phosphor attached to a high speed (i.e., numerical aperture (N.A.)=1), non-scintillating fiber optics image transfer device. The relative brightness for this device is shown and a relative brightness of 1.0 is set as the reference value. The spatial resolution of 9–10 line pairs per millimeter (lp/mm) observed is close to that of the Nyquist frequency of the camera system employed. The absorption efficiency is only 27% under these x-ray conditions.

The use of a scintillating fiber optic (SFO) without any overcoatings (sample 2) provides improved spatial resolution, improved x-ray absorption efficiency, but a lower light level than the more efficient crystalline phosphor screen. However, light escaping out the back of the device can be harnessed with the use of a mirror (sample 3) in order to effectively channel the light back towards the CCD. This results in no detectable change in the spatial resolution but provides an improvement over the uncoated configuration by nearly a factor of 2.

The SFO sensor (sample 3) is nearly 25% brighter than the phosphor screen, sample 1.

Sample 4, an example of the use of the present invention, provides further gains over the phosphor/non-scintillating configuration (sample 1), the SFO configurations with no coatings (sample 2), and with the mirror coating (sample 3). In this case the spatial resolution remains high, but the relative brightness jumps to 1.78 with a combined absorption efficiency of 92%. In this case the brightness improvement of the popular phosphor alone configuration is 78%. The brightness enhancement over the mirror backed SFO configuration is 43%. This indicates that the use of the hybrid luminescent device of the present invention will provide at least another 43% improvement in dose efficiency or dose reduction over prior technology under these x-ray conditions.

It should be noted that the SFO has a numerical aperture (N.A.) of 0.6. The impact of using a smaller N.A. is that the acceptance angle of light into and out of the plate is smaller than that of a fiber optic with a numerical aperture of 1.0. This means that light from a more remote location in the deposited phosphor will enter a fiber with the 1.0 N.A. fiber optics plate than with the 0.6 N.A. fiber optics plate. The higher resolution of the SFO further biases the combined spatial resolution of the hybrid luminescent device toward higher values.

In this invention, comparable or higher light levels can be obtained from a smaller N.A. fiber optics component (as shown in sample 4, Table 1) and also provide higher spatial resolution and improved modulation through the resolution pattern used over that of the faster (i.e., higher N.A.) non-scintillating fiber optic/phosphor configuration.

Sample 5 shows what the relative brightness levels would be if the phosphor were deposited onto a non-scintillating fiber optics plate that has an equivalent N.A. to the SFO of sample 4. Note that there is a reduction in the relative brightness in relation to the higher speed fiber optics plate in sample 1 and the resolution does not improve as it does in the present invention, sample 4.

It should be noted that the spatial resolution of this configuration can be increased by using smaller CCD pixels, or by using a non-scintillating fiber optics taper with a smaller demagnification or by using a non-scintillating fiber optics taper with no magnification at all (concerning the latter, see Table 4). Using a configuration where there is only a N.A.=1.0 straight (non-tapered, no demagnification) fiber optics conduit attached to a CCD containing 25 μm×25 μm pixels, the inventors detected, very high modulation at 14.3 lp/mm through a 14.3 lp/mm lead filled alternating density pattern at 70 kV with the new invention using sample 4 (Table 1). There was virtually no modulation through this same pattern using sample 1 of Table 1. Therefore, if sample 1 and sample 4 were each placed onto a similar CCD directly, i.e. with no interfering fiber optic, sample 4 would provide a higher spatial resolution and higher image contrast due to a smaller light spread onto the CCD and the contribution of the high resolution light produced from the SFO. So in the direct coupling of phosphor coated fiber optics, the present invention will provide not only increased light levels (in most cases and especially at higher energies), but also more directivity into single pixels due to its lower N.A., and the contribution to high resolution from the SFO part of the device. As stated above, the higher numerical aperture of sample 1 results in a higher exit angle which results in light diffusion into remote pixels. Since there is more stray light from the higher N.A. sample, sample 1, in relation to the invention, sample 4, the average CCD intensity from sample 1 increases in relation to sample 4 when the respective samples are attached directly to a CCD or through a straight fiber optics component with a N.A.=1. In these cases, these devices accept the higher angle of light, substantially prevalent in sample 1 (in relation to sample 4) that increases the corresponding CCD pixel value in relation to sample 4. This light is transferred into adjacent fibers or pixels. Even though there is increased light in relation to the invention when moving to a faster optical system, the present invention (sample 4) still has a higher modulation transfer function and a higher spatial resolution. As stated, this is visibly and quantitatively apparent in practice. The fiber optics taper, which has a smaller acceptance angle than a straight fiber optics conduit or CCD rejects some of the stray light from the higher N.A. material, sample 1. As a result, the difference in light levels increases and sample 4 now becomes much brighter than the sample 1 approach.

In general, the light level increase for the invention will be much greater than other phosphor configurations on higher N.A. fiber optics as the acceptance angle of the optics decreases. For example, lens optics typically have more restricted acceptance angles than fiber optics for a given field of view. Therefore, for a given field of view, a lens will collect, by as much as a factor of 10, less light than a fiber optic component.

Further gains in spatial resolution can be obtained as the x-ray energy is decreased for any configuration with the use of this invention. This can be realized since the phosphor layer can be made thinner to absorb an equivalent amount of radiation. For applications such as mammography, it may be required to go to smaller CCD pixels in order to fully exploit the spatial resolution that can be obtained from this system. With a thin deposition of phosphor onto the SFO, i.e., on the order of 10 μm, the inventors have measured better the 20 lp/mm spatial resolution. An estimate of 10% modulation through the line pattern was observed with this configuration at 40 kV.

EXAMPLE 2

As is the conventional approach in prior art x-ray screens, thicker phosphor screens are used to more effectively absorb the penetrating radiation as the radiation energy is increased. However, with the present invention, the phosphor layer need not be made thicker since the SFO will provide all the x-ray absorption efficiency required. However, the use of thicker phosphor screens in combination with an SFO can provide further and substantial increases in brightness and improvements in spatial resolution over the use of the phosphor alone or even with most practical non-scintillating fiber optics.

An example of the use of a thick phosphor screen in combination with a SFO is shown in samples 6 and 7 (Table 1) and samples 11 and 13 (Table 2). In these cases, large increases in brightness can be obtained from the low resolution screen. This brightness can be augmented by the use of the SFO in combination with the low resolution screen. In this case the brightness increases by 5–10% at 70 kV (see Tables 1 and 2), but this % increase goes up by approximately 40% under 160 kV x-rays using a beam of the kind typically employed in nondestructive inspections (see Table 2). It is also interesting to note that the spatial resolution goes up for the (ZnCd)S:Ag,Cu screen with the use of the present invention (see Table 1, sample 7 and Table 2, sample 13). Incrementally thinner depositions of this very bright screen may make the combination of the SFO and this phosphor a very attractive approach for the medical imaging industry. A thin screen of this material is now not typically used because it will have an unacceptably low absorption efficiency as compared to the commonly used $Gd_2O_2S$:Tb or gadolinium oxysulfide (GOS) screens of comparable thickness.

Sample 8 is a reference material similar to that of sample 1. Table 2 provides data as the x-ray energy is increased. Sample 9 is an example of the present invention, similar to that tested in sample 4. Note that the repeat measurement of this sample results in a value similar to that shown for sample 4 in Table 1. Importantly, the improvement in brightness at 70 kV increases to 2.57 at 160 kV.

TABLE 2

Brightness of Fiber Optic/Phosphor Combinations as a Function of X-Ray Energy.[1]
All x-ray exposures taken with Kevex 160 Microfocus x-ray unit at energies listed
Coupling grease, CCD camera, N.A. and Spatial Resolution Information as in Table 1.
Scintillating Fiber Optic Based on U.S. Pat. No. 5,122,671

| Sampl | Fiber Optic | Phosphor | Spatial Resolution at 70 kV (lp/mm) | X-Ray Energy | | |
|---|---|---|---|---|---|---|
| | | | | 70 kV | 120 kV | 160 kV |
| 8 | 1.0 NA non-scintillating FO | $Gd_2O_2S$:Tb 50 mg/cm$^2$ | 9–10 | 1.00 | 1.00 | 1.00 |
| 9 | 0.6 NA Scintillating FO | $Gd_2O_2S$:Tb 50 mg/cm$^2$ | 10–11 | 1.87 | 2.29 | 2.57 |
| 10 | 1.0 NA non-scintillating FO | $Gd_2O_2S$:Tb 100 mg/cm$^2$ | 6–6.5 | 3.46 | 3.50 | 3.67 |
| 11 | 0.6 NA Scintillating FO | $Gd_2O_2S$:Tb 100 mg/cm$^2$ | 6.5–7 | 4.23 | 4.83 | 5.30 |
| 12 | 1.0 NA non-scintillating FO | (ZnCd)S:Ag, Cu 100 mg/cm$^2$ | 3–3.5 | 6.68 | 5.35 | 4.81 |
| 13 | 0.6 NA Scintillating FO | (ZnCd)S:Ag, Cu 100 mg/cm$^2$ | 5.8–6.3 | 7.03 | 6.75 | 6.59 |

[1]Beam Filtration:
70 kV: 2 mm pure aluminum
120 kV: 4 mm pure aluminum
160 kV: 8 mm pure aluminum Sample 10 shows an example of the prior art. Note that this phosphor is composed of a thicker deposition of the same phosphor material as samples 8 and 9 and subsequently produces a much higher signal. The invention, sample 11, shows an improvement from 1.22 at 70 kV to 1.44 at 160 kV. The spread in light levels is not as high as in the first case since this phosphor material is thicker and more absorbing of these x-ray beams than the thinner phosphor screen. More importantly is the improvement in spatial resolution of sample 11, the invention, in relation to the prior art.

As already discussed, the improvement in light output for the (ZnCd)S:Cu,Ag material, samples 12 vs 13, is not as pronounced because of the high phosphor layer thickness of this material. It should be noted with regard to sample 12 that as the x-ray energies are increased, the relative brightness levels decrease in relation to the GOS material. This is consistent with the lower absorption characteristics of the lower effective atomic number phosphor. However, the present invention as illustrated in sample 13 buffers this decrease with improved absorption efficiency and corresponding conversion through the SFO. For example, sample 13 remains at least 6.5 fold brighter than the reference material at all energies.

FIG. 4 graphically shows the trends of the invention and the prior art for the examples in Table 2. In the various embodiments of the invention (samples 9, 11, and 13), there is an increasing gap in brightness as the energy is increased in relation to the prior art devices of Samples 8, 10 and 12, respectively. This graph shows that this gap would continue to decrease at energies below 70 kV.

Regarding the generally adverse effect of increasing radiation energies on spatial resolution of connected luminescent devices, a scintillating fiber optic device or SFO will also experience lower spatial resolution as the energy is increased if the fibers are not aligned with the cone beam of x-rays arriving at the hybrid structure. A focused SFO device (i.e. where the glass fibers are directed back toward the focal spot) can reduce the spatial resolution loss from the SFO.

It should be noted that the use of a thinner phosphor layer with the SFO may produce a comparable or acceptable signal level and enhanced spatial resolution in relation to a faster, phosphor screen on a non-scintillating fiber optic. Conversely, a combination of the SFO with a thicker phosphor screen can offer substantial improvements in light output with very acceptable values of spatial resolution and as such can enable the use of the thicker (brighter) screen in applications previously believed to require thinner higher resolution phosphor screens.

As mentioned earlier in this disclosure, the SFO face plate of the present invention has a contrast enhancement agent in the form of extramural absorbing (EMA) fibers interspersed within the fiber matrix of the SFO face plate. The EMA fibers are effective to absorb stray light traveling through the glass in a lateral direction from the longitudinal fiber direction. In the absence of the opaque white outer cladding layer (as discussed above in connection with FIG. 2A) or the use of downstream restricted aperture optics (discussed below), it is imperative to optimize the thickness of the SFO face plate so that the EMA fibers can adequately absorb this stray light before the light exits the SFO at the exit face.

As best seen in FIG. 5A, for the case of a thin SFO face plate, the EMA material may not capture all the stray light which originates from a particular fiber (in this case the middle fiber shown in the drawing) before it reaches the output face of the SFO, thereby causing a degradation in the contrast of the image. FIG. 5B shows that as the glass thickness of the SFO is increased to larger than the actual radiation penetration depth, the effectiveness of the EMA material in capturing is improved and the image contrast is enhanced accordingly.

FIG. 5C shows the effect of increasing the thickness of these face plates on the modulation transfer function (MTF). Here the modulation in the signal for an edge function is plotted as a function of the spatial frequency. At low spatial frequencies, the thinner SFO face plates have a drop in intensity, indicating that there is stray light that has travelled on the order of 0.1–0.5 mm in the glass. This stray light reduces the discrimination in intensities in the signal. As the thickness is increased from 1/16 inch to 1/8 inch to 1/4 inch, this contrast degradation is eliminated. The data in FIG. 5C suggest that an optimal thickness for the SFO/phosphor hybrid device be at least 2 times the radiation penetration length into the glass so as to assure proper stray light filtering.

The use of thick fiber optics may present some other problems depending on the radiation employed. These include the parallax effect where diverging penetrating radiation crosses fibers as it enters the device. As discussed earlier, focussing the fibers of the SFO face plate will reduce the parallax effect.

Another alternative method that does not require increased thickness for the SFO face plate is discussed below.

EXAMPLE 3

The results of Table 1 and Table 2 as described above involve coupling various hybrid luminescent device combinations to a CCD with a pre-installed non-scintillating fiber optic taper placed as a light input to the CCD. Table 3 provides a configuration where the phosphor is directly attached to the taper.

luminescent device of the present invention. From inspection of the curves in FIG. 6, it becomes readily apparent to those skilled in the art that the thicker SFO plates as used in both the present invention and in prior art will capture an increasingly greater number of x-ray photons and subsequently convert more of these captured photons into light than is achieved by the prior art phosphor screens alone. It is also apparent that the hybrid luminescent device of the present invention is brighter than all combinations at the critical lower energy range frequently used in medical imaging. Table 4 also shows that the resolution remains high for this hybrid device across the energy range studied.

EXAMPLE 4

When coupling removable luminescent devices (i.e., such as a scintillating fiber optic face plate or a phosphor screen) directly onto a CCD for testing purposes, there is always a risk when applying or removing the luminescent device that

TABLE 3

Brightness and Spatial Resolution of Fiber Optic/Phosphor Combinations as a Function of X-Ray Energy.[1] Data collected in accordance with footnote 2.

| Sampl | Fiber Optic | Coating or screen | Brightness (DN/mR) | | | Spatial Resolution (lp/mm) | | |
|---|---|---|---|---|---|---|---|---|
| | | | 70 kV | 120 kV | 160 kV | 70 kV | 120 kV | 160 kV |
| 14 | Bare Taper | $Gd_2O_2S:Tb$ 50 mg/cm$^2$ | 17.1 | 24.6 | 16.2 | 9 | 7.5 | 7.5 |
| 15 | 0.6 NA Scintillating FO | $Gd_2O_2S:Tb$ 50 mg/cm$^2$ | 23.3 | 53.4 | 45.6 | 9 | 8 | 6 |
| 16 | 0.6 NA Scintillating FO | none | 8.5 | 28.4 | 27.5 | 9 | 7.5 | 6 |
| 17 | 0.6 NA Scintillating FO | mirror | 15.3 | 50.4 | 48.3 | 10.5 | 9.5 | 9 |

[1]Beam Filtration:
70 kV: 2 mm pure Aluminum
120 kV: 19 mm pure Aluminum, 1.3 mm Copper
160 kV: 19 mm pure Aluminum, 2.9 mm Copper This coupling configuration simulates an actual phosphor CCD coupling configuration in that a number of commercial systems, some currently in the field of mammography, are based on attaching a high resolution phosphor directly to such a taper.

FIG. 6 shows in graphical form the response of those values in Table 3 and further illustrates the improvement in light output that can be obtained by using the hybrid the CCD will suffer damage by either abrasion or by some other mechanical defect such as a broken wire bond. The experiments of this example and which are described in Table 4 below provide data where some other fiber optics component is already attached to the CCD in order to avoid damage to the CCD and to maintain consistency of performance of the device for various tests.

TABLE 4

Brightness and Spatial Resolution Results of Fiber Optic/Phosphor Combinations as a Function of X-Ray Energy[1]

| Sampl | Fiber Optic | Coating or screen | Spatial Resolution at 70 kV (lp/mm) | Brightness | | |
|---|---|---|---|---|---|---|
| | | | | 70 kV | 120 kV | 160 kV |
| A. High Resolution Phosphor Configurations | | | | | | |
| 18 | 1.0 NA non-scintillating FO | $Gd_2O_2S:Tb$ 50 mg/cm$^2$ | 9.5 | 1.00 | 1.00 | 1.00 |
| 19 | 0.6 NA non-scintillating FO | $Gd_2O_2S:Tb$ 50 mg/cm$^2$ | 13 | 0.48 | 0.52 | 0.59 |
| 20 | 0.6 NA Scintillating FO | $Gd_2O_2S:Tb$ 50 mg/cm$^2$ | 16 | 0.79 | 1.51 | 2.21 |
| 21 | 0.6 NA Scintillating FO | none | 21 | 0.29 | 0.88 | 1.43 |
| 22 | 0.6 NA Scintillating FO | mirror | 18 | 0.53 | 1.44 | 2.25 |

TABLE 4-continued

Brightness and Spatial Resolution Results of Fiber Optic/Phosphor
Combinations as a Function of X-Ray Energy[1]

| Sampl | Fiber Optic | Coating or screen | Spatial Resolution at 70 kV (lp/mm) | Brightness | | |
|---|---|---|---|---|---|---|
| | | | | 70 kV | 120 kV | 160 kV |
| B. High Output Phosphor Configurations | | | | | | |
| 23 | 1.0 NA non-scintillating FO | $Gd_2O_2S:Tb$ 100 mg/cm$^2$ | 5 | 4.54 | 3.94 | 3.96 |
| 24 | 0.6 NA non-Scintillating FO | $Gd_2O_2S:Tb$ 100 mg/cm$^2$ | 8 | 1.87 | 2.13 | 2.40 |
| 25 | 0.6 NA Scintillating FO | $Gd_2O_2S:Tb$ 100 mg/cm$^2$ | 10 | 1.88 | 2.86 | 3.64 |

[1]Philips 160 kV x-ray source. A 2048 × 2048 CCD chip that is used. A permanently bonded N.A. = 1.0 image conduit fiber optic plate is attached to the CCD. Dow-Corning # Q2-3067 for coupling.
70 kV: 2 mm pure Aluminum;
120 kV: 19 mm pure Aluminum, 1.3 mm Copper
160 kV: 19 mm pure Aluminum, 2.9 mm Copper Table 4 shows the response of the hybrid luminescent device input into the CCD via a straight 1.0 N.A. fiber optics conduit (6 μm fiber diameter) attached to a CCD. In some cases this is more of a direct analogy to coupling these devices directly to the CCD. Again, if the input to the conduit is viewed by a CCD, then the phosphor would have to be coupled through a shielding fiber optics as shown in Table 4. Two types of non-scintillating fiber optics coupling units are presented in Table 4 as are two types of phosphor screen systems. There is a coupling unit with N.A.=1.0 and a second with N.A.=0.6. Data for a high resolution and a high output set of phosphor configurations is provided and compared to the hybrid analogs. Mirror backed scintillating fiber optics data is provided for comparison.

The results in Table 4 show that dramatic improvements are possible in spatial resolution when a 0.6 N.A. fiber optic face plate is placed between a phosphor and the CCD. As stated earlier, a non-scintillating fiber optic face plate is required to assure that the CCD and other detection devices is properly shielded from direct radiation. Table 4 shows that an SFO can improve both the resolution over the non-scintillating 0.6 N.A. fiber optic and the 1.0 N.A. non-scintillating fiber optic. Furthermore, Table 4 shows that the present invention will enhance the light output or brightness at all energies listed over the 0.6 N.A. non-scintillating fiber optic and above and is competitive with the 1.0 N.A. non-scintillating fiber optic which captures a larger portion of stray light than the 0.6 N.A. fiber optic. In this case, the 1.0 N.A. non-scintillating fiber optic is showing higher levels than in the previous taper experiments since the CCD captures more of this light through the high speed conduit (which simulates coupling to the bare CCD).

Furthermore, Table 4 shows that if the spatial resolution of about 10 lp/mm is adequate, than this can be achieved by use of a much thicker phosphor screen (100 mg/cm$^2$) coupled to the SFO but with nearly a factor of 2 improvement in brightness. These values improve to nearly a factor of 4 at 160 kV without degradation in the spatial resolution of the image.

Table 4 also demonstrates that there are gains to coupling the heavier loaded (100 mg/cm$^2$) phosphor to the SFO in terms of brightness or resolution over coupling this same phosphor to the 0.6 N.A. non-scintillating fiber optics shown.

During this investigation, we also discovered that the use of a coupling agent such as an optical coupling fluid or optical epoxy applied between the phosphor layer and the SFO (see FIG. 2) increases the spatial resolution by around 10–20% with a concomitant loss in brightness of about 25%. We have found that Dow-Corning optical grease #Q2-3067 is a suitable optical coupling fluid for use in the present invention.

We have also found that an optical coupling fluid or optical epoxy will advantageously reduce refraction, light scatter and back reflections of light between the phosphor layer and the SFO and will provide an index matching airless media therebetween.

This affords a high transfer efficiency of light between the luminescent components without the advent of reflection, refraction and the subsequent loss of contrast through light scatter. Another important aspect of having the appropriate coupling fluid is to keep the luminescent components in close proximity to one another to assure minimal air gaps which also result in spreading and subsequent scattering of light at this interfacial region.

Exemplary methods for attaching the phosphor particles to a surface of the SFO are as follows:

(1) Coupling a commercially or specially prepared phosphor screen composed of phosphor particles embedded in an organic binder and both fixed onto a Mylar or equivalent base substrate via optical coupling fluid or optical coupling adhesive.

(2) Depositing phosphor particles directly onto the SFO component using known procedures common to the art where the appropriate binder is co-deposited to provide an intimate contact among adjacent, internally disposed, phosphor particles as well as provide intimate contact between the exposed surface phosphor particles with the surface of the SFO face plate.

In both configurations described above the phosphor architecture, (e.g., phosphor type, phosphor grain size, and phosphor loading) and the fiber architecture (e.g., the scintillating fiber optic employed, fiber size and thickness) can be tailored for a particular application at hand to achieve the resolution and speed desired for the final system.

It is also helpful when attaching the output face of the SFO to another component directly, to have a similar optical coupling grease or adhesive of the appropriate index of refraction at this interface to perform the same function as that described above for the phosphor/SFO interface. Components such as an electronic sensor in the form of a CCD or a photocathode or a film light recording media are examples where the hybrid device can be directly attached via this optical coupling media.

TABLE 5

Relative brightness and spatial resolution of the invention with and without optical coupling fluid at the important interfaces of the hybrid luminescent device. The hybrid device is input into a 1024 × 1024 CCD through a fiber optic taper that has an effective pixel size of 50 μm × 50 μm The optical coupling fluid used is Dow-Corning Q2-3067
Philips 160 X-ray source employed

| Sample # | fiber optic used | phosphor screen | optical coupling fluid | spatial resolution at 70 kV (lp/mm) | Relative Brightness at 70 kV |
|---|---|---|---|---|---|
| 26 | 0.6 NA SFO | 50 mg/cm² (Gd₂O₂S:Tb) | At taper/SFO bond and SFO/phosphor bond | 10.0 | 1.0 |
| 27 | 0.6 NA SFO | 50 mg/cm² Gd₂O₂S:Tb | At taper/SFO bond only | 8.0 | 1.4 |
| 28 | 0.6 NA SFO | 50 mg/cm² Gd₂O₂S:Tb | At SFO/phosphor bond only | 9.0 | 0.88 |
| 29 | 0.6 NA SFO | 50 mg/cm² Gd₂O₂S:Tb | none | 9.0 | 1.25 |

Table 5 shows the effect of the optical coupling fluid on spatial resolution directly. Coupling fluid applied at the phosphor/SFO interface and at the SFO/taper interface (sample 26) provides a 20% improvement in spatial resolution as compared to the case where coupling fluid is applied at the SFO/taper interface only (sample 27). The concomitant reduction in light levels of 40% is a result of a reduction of stray light reaching the CCD. Therefore, the image contrast improves with the use of the coupling fluid. Comparison data is shown in sample 28 (coupling fluid applied to SFO/phosphor interface only) and sample 29 (no coupling fluid applied at either interface). Prior examples have shown that even with the use of the optical coupling fluid, the total light levels of the new invention are substantially higher than the prior art.

Table 5 also shows the advantage of using an optical coupling fluid in between two fiber optic components. FIG. 7 shows the corresponding experimental set up configuration for Sample 26 of Table 5 in which a coupling agent, in this case Dow Corning Q2-3067 optical coupling fluid, is used to secure the phosphor layer to the input face of the SFO and is also used to secure the input of the fiber optic taper to the output face of the SFO. In this configuration, the light output, image contrast and spatial resolution all improve with the implementation of this coupling media.

The use of an optical coupling fluid to further enhance spatial resolution should therefore be weighed against the required speed and exposure of the application. It should be noted that the brightness and the spatial resolution both increase with the use of the appropriate optical coupling fluid between fiber optic components, i.e., the SFO and a non-scintillating fiber optic device or between the SFO and a CCD.

We have also discovered that the contrast sensitivity of the hybrid luminescent device of the present invention can be improved by placing restrictive aperture collection optics at the exit face of the SFO.

FIGS. 7A–7B illustrate the stray light filtering effect which results when coupling a restrictive aperture collection optical device (in this example a fiber optic taper) to the output face of the SFO.

FIG. 7A shows an enlarged view of the region encircled by Arrows 7A—7A in FIG. 7. Scintillation activity may occur in both the phosphor layer and the SFO. These scintillations produce light photons which travel in all directions. In order to achieve good brightness and contrast sensitivity, it is necessary to be able to:

(1) channel light which is generated within or captured by a particular fiber in the SFO to the output face of the SFO device; and (2) reject and filter stray light which crosses from one fiber to another in either the SFO or the fiber optic taper.

Stray light is light which travels laterally in the SFO face plate and which has already exceeded the critical angle (i.e., the angle at which the light will no longer be internally reflected by the primary transparent cladding layer of a particular fiber). Stray light which reaches the output face of the SFO will therefore exit at a larger angle than the collimated light traveling down the individual fibers of the SFO, with the preference to refract in the direction parallel with the output face of the SFO. A restricted aperture optical collection device such as a lens with a high F-stop (not shown) or a fiber optic taper with a low effective numerical aperture (e.g., FIGS. 7 and 7A) is effective to filter this non-collimated light and reduce this crosstalk. The use of such a restricted aperture device does not necessarily require that the SFO be thick. This then eliminates the possible side complications of the parallax effect or penetrating radiation scatter within the plate. As seen in FIG. 7B, the fiber optic taper preferably includes EMA material interspersed through the fiber bundle so as to absorb stray light which is not otherwise filtered out the sides of the taper.

For a SFO face plate of a given thickness the attachment of this face plate to a high numerical aperture (1.0) fiber optic component (i.e., one that has a high acceptance angle and that does not taper) will achieve a reduction in the MTF in the low spatial frequency region as shown by sample a in FIG. 7C. When this same face plate is attached to a fiber optic taper where the demagnification of the imaging device (CCD) is 3.4:1 and the effective numerical aperture is 1/3.4 or approximately 0.3, the curve does not drop off at all in the low spatial frequency domain as shown in FIG. 7C.

This effect can be seen by simply varying the F-stop of a lens from the high speed, wide open settings down to the slow high F-stop settings.

Normally in x-ray imaging and other applications, it is imperative to capture as much light as possible to increase the signal statistics. However, the investigator must weigh the importance of the light that is collected and the complications from light scatter that may occur if the selected aperture for the collection device is too large. The benefit of this new invention is that since there is a boost of light provided by the hybrid device, one can reduce some of the stray light to further enhance the contrast without sacrificing the signal levels obtained in other prior art phosphor systems.

EXAMPLE 5

The performance characteristics for the hybrid luminescent device was also studied for use as an electron scintillator for transmission electron microscopy (TEM) in terms of brightness in the electron energy range of 100–400 keV.

curve 3 show the brightness of a 20 μm-P20 phosphor on glass (i.e. without the SFO) and an uncoated SFO (without the phosphor), respectively, measured under identical conditions as for curve 1.

The relative brightness data for the above three combinations is summarized below in Table 6 with the P20 phosphor on glass normalized to 1 at 4 select electron beam energies.

TABLE 6

Brightness of Fiber Optic/Phosphor Combinations as a Function of Electron Beam Energy

| Sampl | Substrate | Phosphor | Relative Brightness Levels at the given electron beam energies | | | |
|---|---|---|---|---|---|---|
| | | | 100 kV | 200 kV | 300 kV | 400 kV |
| 30 | Clear Glass Disc | P-20* phosphor, 20 μm thickness | 1.00 | 1.00 | 1.00 | 1.00 |
| 31 | 0.6 NA Scintillating FO | P-20 phosphor, 17 μm thickness | 1.1 | 1.7 | 2.5 | 3.1 |

*P-20 is (ZnCd)S:Ag

The SFO face plate tested contains 6-μm fibers. The piece tested for this study was made without EMA. A piece measuring 57 mm×39 mm×7.5 mm was used for the measurements of brightness. To test the effect of phosphor coating on the brightness, the plate surface facing the incident electrons was coated with a 17-μm layer of a Zinc-Cadmium Sulfide, silver doped phosphor ((ZnCd)S:Ag), referred to herein as a green "P20 phosphor". The entire surface was then coated with a thin layer of aluminum for charge conduction and light reflection.

The measurement setup is schematically shown in FIG. 8. The above prepared SFO plate is placed on a leaded glass window which seals the microscope vacuum and provides x-ray shielding. To avoid Newton rings, which have been observed due to the small, irregular gap between the SFO and the glass window, a piece of aluminum foil, 18±2 μm thick, with a cut-out window was used to support the SFO. The gap thus created was much greater than the light wavelength (550 nm) involved, thereby Newton rings are completely eliminated. Two Nikon lenses, one with a focal length of 24 mm and an F-number of 2.8, the other 85 mm and an F-number of 2.0, were used face-to-face to relay the image to a CCD chip. Focusing rings on both lenses are set to infinity, and apertures were set all the way open. The theoretical magnification of such a lens configuration is the focal length ratio of the two lenses, i.e. 85/24=3.54 x. Actual measurement using a USAF 1951 test pattern gives a magnification of x 3.46±1%. A Photometrics CCD camera and a Macintosh computer were used to acquire and analyze images. The camera head was type CH250 and the CCD chip was a Kodak KAF-4200 with 2 k×2 k pixels and a pixel size of 9 μm×9 μm.

FIG. 9 shows the relative brightness of the SFO with the 17 μm P20 phosphor coating (curve 1) at electron energies ranging form 100 to 400 keV at 25 keV increments, on a JEOL-4000EX microscope. The vertical axis is the image mean intensity, obtained by maintaining uniform illumination of constant beam current of 100 pA/cm$^2$ for all voltages at the microscope small focusing screen. The exposure time was 60 seconds for all images. For comparison, curve 2 and The photon output of the SFO, without phosphor coating (i.e. curve 3, FIG. 9), increased linearly with the energy of the incident electrons, but was about 20–40% that of the combined phosphor and SFO screen (curve 1) for the entire energy range tested. With a 17-μm layer of P20 phosphor coating, the SFO is brighter than the 20-μm layer of phosphor coating on glass for the entire energy range tested. The invention shows a decrease in brightness from 100 to 300 keV, but becomes less so in the range 300 to 400 keV, and is expected to flatten-out and increase after that, as the brightness of the SFO becomes dominant.

Table 6 demonstrates that this invention has value in improving the detection of electron beams. Note that the thinner phosphor material on the SFO (sample 31) provides nearly a factor of 3 improvement in light output at 400 keV electron energy than a thicker version of the same phosphor on a piece of glass (sample 30). (Note: this data was collected via lens coupling to a CCD camera. The transmission of the glass plate used as sample 30 is expected to provide at least the same, if not better transmission of light produced in the phosphor than the use of a 1.0 N.A. fiber optic plate). The drawback of the clear glass plate in systems design is that there is severe spatial resolution degradation if this plate is coupled directly to a CCD or through a fiber optic window. These examples show the importance of the absorption powers of the SFO even for an electron beam which has a smaller penetration range than an x-ray beam for an equivalent energy.

While we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claims.

What is claimed is:

1. An improved luminescent system for imaging penetrating radiation of the type which includes a first thin screen having a first selected particulate scintillative material effective to convert penetrating radiation into light and a first index of refraction and a second fiber optic thick screen containing a second scintillative material effective to convert penetrating radiation into light and a second index of refraction which is lower than the first index of refraction of the first thin screen, the second fiber optic thick screen having an input end and an output end, wherein the improvement comprises:

a) optical coupling means for optically coupling an interface region between the first thin screen and the input end of the second fiber optic thick screen in a closely stacked manner such that substantially no air gaps are permitted to form at said interface region;

b) the first thin screen having reflective properties effective to redirect backwardly directed light generated in the second fiber optic thick screen toward the output end thereof; and c) said optical coupling means having an index of refraction selected to closely match the respective indices of refraction for each of the first thin screen and the second fiber optic thick screen such that light refraction, light reflection and light scattering at said interface region is reduced and transmission efficiency of light from the first thin screen to the second fiber optic thick screen is increased.

2. The invention as defined in claim 1 wherein said coupling means comprises an optical coupling fluid for removably coupling the first thin screen to the input end of the second fiber optic thick screen.

3. The invention as defined in claim 1 wherein said coupling means comprises an optical adhesive for permanently coupling the first thin screen to the input end of the second fiber optic thick screen.

4. The invention as defined in claim 1 wherein the second fiber optic thick screen is composed of a drawn bundle of light conducting glass fibers fashioned into a face plate and wherein each fiber comprises:

a) an inner fiber core which contains the second scintillative material;

b) a primary cladding layer of transparent glass material surrounding said inner fiber core and effective to reflect light back into said inner fiber core; and c) a secondary cladding layer of opaque white glass material surrounding said primary cladding layer and effective to capture stray light which escapes said primary cladding layer and channel said stray light as a halo of additional light adjacent an output end of said inner fiber core.

5. The invention as defined in claim 4 wherein:

a) said second fiber optic thick screen further includes a plurality of opaque dark color glass fibers selectively interspersed throughout the bundle of light conducting glass fibers, said opaque dark color glass fibers effective to absorb stray light which cannot be guided to a respective output end of a particular light conducting fiber from which the stray light originated or was first captured as a result of scintillation activity in the first thin screen; and b) said second fiber optic thick screen having a thickness dimension which is selected to be at least twice as great as a corresponding penetration depth of radiation being imaged by the luminescent system.

6. The invention as defined in claim 1 wherein:

a) the second fiber optic thick screen is composed of a drawn bundle of light conducting glass fibers fashioned into a face plate and including a plurality of opaque dark color glass fibers, said opaque dark color glass fibers effective to absorb stray light which cannot be guided to a respective output end of a particular light conducting fiber from which the stray light originated or was first captured as a result of scintillation activity in the first thin screen; and b) said second fiber optic thick screen having a thickness dimension which is selected to be at least twice as great as a corresponding penetration depth of radiation being imaged by the luminescent system.

7. The invention as defined in claim 1 which includes a restrictive aperture optical device disposed optically having an input end coupled to the output end of the second fiber optic thick screen and an output end for coupling to an image recording media, said restrictive aperture optical device being effective to filter stray light which reaches the output end of the second fiber optic thick screen and thereby provide improved contrast sensitivity at an image plane corresponding to said output end of said restrictive aperture optical device.

8. The invention of claim 7 wherein the restrictive aperture optical device comprises a fiber optics taper.

9. The invention of claim 7 wherein the restrictive aperture optical device comprises a lens system having F-stops which are selected in accordance with stray light characteristics of the luminescent system.

10. A device for imaging penetrating radiation comprising:

a) a fiber optic thick screen composed of a drawn bundle of light conducting glass fibers fashioned into a face plate and wherein each fiber includes:

i) an inner fiber core containing a scintillating material for converting radiation into light, said inner fiber core for conducting converted light to an output end thereof;

ii) a primary cladding layer of transparent glass material surrounding said inner fiber core and effective to reflect light back into said inner fiber core; and iii) a secondary cladding layer of opaque white glass material surrounding said primary cladding layer and effective to capture stray light which escapes said primary cladding layer and channel said stray light as a halo of additional light adjacent said output end of said inner fiber core to provide enhanced luminescent output, contrast sensitivity and image resolution.

11. A luminescent system for imaging penetrating radiation comprising:

a) a first thin screen having a first selected particulate scintillative material and a first index of refraction, said first selected particulate material effective to convert penetrating radiation into light;

b) a second fiber optic thick screen containing a second scintillative material and a second index of refraction which is lower than the first index of refraction of the first thin screen, the second fiber optic thick screen having an input end and an output end, said second scintillative material effective to convert penetrating radiation into light;

c) optical coupling means for optically coupling an interface region between said first thin screen and said input end of said second fiber optic thick screen in a closely stacked manner such that substantially no air gaps are permitted to form at said interface region;

d) said first thin screen having reflective properties effective to redirect backwardly directed light generated in said second fiber optic thick screen toward said output end; and e) said optical coupling means having an index of refraction selected to closely match the respective indexes of refraction for each of said first thin screen and said second fiber optic thick screen such that light refraction, light reflection and light scattering at said interface region is reduced and transmission efficiency of light from said first thin screen to said second fiber optic thick screen is increased.

12. The invention as defined in claim 11 wherein said coupling means comprises an optical coupling fluid for removably coupling the first thin screen to the input end of the second fiber optic thick screen.

13. The invention as defined in claim 11 wherein said coupling means comprises an optical adhesive for permanently coupling the first thin screen to the input end of the second fiber optic thick screen.

14. The invention as defined in claim 11 wherein the second fiber optic thick screen is composed of a drawn bundle of light conducting glass fibers fashioned into a face plate and wherein each fiber comprises:

a) an inner fiber core which contains the second scintillating material;

b) a primary cladding layer of transparent glass material surrounding said inner fiber core and effective to reflect light back into said inner fiber core; and c) a secondary cladding layer of opaque white glass material surrounding said primary cladding layer and effective to capture stray light which escapes said primary cladding layer and channel said stray light as a halo of additional light adjacent an output end of said inner fiber core.

15. The invention as defined in claim 14 wherein:

a) said second fiber optic thick screen further includes a plurality of opaque dark color glass fibers selectively interspersed throughout the bundle of light conducting glass fibers, said opaque dark color glass fibers effective to absorb stray light which cannot be guided to a respective output end of a particular light conducting fiber from which the stray light originated or was first captured as a result of scintillation activity in the first thin screen; and b) said second fiber optic thick screen having a thickness dimension which is selected to be at least twice as great as a corresponding penetration depth of radiation being imaged by the luminescent system.

16. The invention as defined in claim 11 wherein:

a) the second fiber optic thick screen is composed of a drawn bundle of light conducting glass fibers fashioned into a face plate and including a plurality of opaque dark color glass fibers selectively interspersed throughout the bundle of light conducting glass fibers, said opaque dark color glass fibers effective to absorb stray light which cannot be guided to a respective output end of a particular light conducting fiber from which the stray light originated or was first captured as a result of scintillation activity in the first thin screen; and b) said second fiber optic thick screen having a thickness dimension which is selected to be at least twice as great as a corresponding penetration depth of radiation being imaged by the luminescent system.

17. The invention as defined in claim 11 which includes a restrictive aperture optical device disposed optically having an input end coupled to the output end of the second fiber optic thick screen and an output end for coupling to an image recording media, said restrictive aperture optical device being effective to filter stray light which reaches the output end of the second fiber optic thick screen and thereby provide improved contrast sensitivity at an image plane corresponding to said output end of said restrictive aperture optical device.

18. The invention of claim 17 wherein the restrictive aperture optical device comprises a fiber optics taper.

19. The invention of claim 17 wherein the restrictive aperture optical device comprises a lens system having F-stops which are selected in accordance with stray light characteristics of the luminescent system.

* * * * *